(12) United States Patent
Morita et al.

(10) Patent No.: US 9,405,003 B2
(45) Date of Patent: Aug. 2, 2016

(54) RADAR APPARATUS

(71) Applicant: Panasonic Corporation, Osaka (JP)

(72) Inventors: Tadashi Morita, Kanagawa (JP); Takaaki Kishigami, Tokyo (JP)

(73) Assignee: Panasonic Corporation, Osaka (JP)

( * ) Notice: Subject to any disclaimer, the term of this patent is extended or adjusted under 35 U.S.C. 154(b) by 170 days.

(21) Appl. No.: 14/394,930

(22) PCT Filed: Feb. 13, 2014

(86) PCT No.: PCT/JP2014/000741
§ 371 (c)(1),
(2) Date: Oct. 16, 2014

(87) PCT Pub. No.: WO2014/132581
PCT Pub. Date: Sep. 4, 2014

(65) Prior Publication Data
US 2015/0123840 A1    May 7, 2015

(30) Foreign Application Priority Data

Feb. 26, 2013    (JP) .................................. 2013-036340

(51) Int. Cl.
*G01S 13/28* (2006.01)
*G01S 13/02* (2006.01)
(Continued)

(52) U.S. Cl.
CPC . *G01S 13/02* (2013.01); *G01S 7/02* (2013.01); *G01S 13/284* (2013.01); *G01S 7/292* (2013.01); *G01S 13/003* (2013.01)

(58) Field of Classification Search
CPC ....... G01S 13/02; G01S 13/003; G01S 13/28; G01S 13/284; G01S 7/02; G01S 7/292

USPC ............. 342/134, 145, 175, 202; 340/870.22; 375/241, 242, 246, 253, 254, 279
See application file for complete search history.

(56) References Cited

U.S. PATENT DOCUMENTS

| 4,353,067 A * | 10/1982 | Mims | .................... G01S 13/284 342/189 |
|---|---|---|---|
| 5,151,702 A * | 9/1992 | Urkowitz | .............. G01S 13/522 342/116 |

(Continued)

FOREIGN PATENT DOCUMENTS

| JP | 2002-214331 A | 7/2002 |
|---|---|---|
| JP | 2004-271529 A | 9/2004 |

(Continued)

OTHER PUBLICATIONS

International Search Report, mailed May 20, 2014, for International Application No. PCT/JP2014/000741, 4 pages.

(Continued)

*Primary Examiner* — Peter Bythrow
(74) *Attorney, Agent, or Firm* — Seed IP Law Group PLLC

(57) ABSTRACT

A transmission signal generating unit generates a transmission signal by multiplying one (selected in prescribed order) of $2^{N+1}$ (N: an integer of 1 or more) codes of a Spano code sequence by one code (selected in prescribed order), having a length 1, of one of a first code or a second code each having a code length $2^{N+1}$ in every transmission cycle. A transmission RF unit converts the transmission signal into a radio-frequency radar transmission signal and transmits it from a transmission antenna. As for codes used in adjacent two transmission cycles for two times $2^{N+1}$ transmission cycles, the sum total of inner products of codes having a length 1 of the first code, inner products of codes having a length 1 of the second code, and inner products of codes of the first code and the second code becomes equal to 0.

16 Claims, 9 Drawing Sheets

(51) Int. Cl.
*G01S 7/02* (2006.01)
*G01S 7/292* (2006.01)
*G01S 13/00* (2006.01)

(56) References Cited

U.S. PATENT DOCUMENTS

| | | | | |
|---|---|---|---|---|
| 5,192,956 | A * | 3/1993 | Lee | G01S 13/288 342/201 |
| 5,376,939 | A * | 12/1994 | Urkowitz | G01S 7/42 342/134 |
| 6,476,758 | B1 * | 11/2002 | Chaput | G01S 13/325 342/118 |
| 2003/0193430 | A1 * | 10/2003 | Gresham | G01S 7/282 342/70 |
| 2004/0178952 | A1 | 9/2004 | Jenkins | |
| 2009/0079617 | A1 | 3/2009 | Shirakawa et al. | |
| 2013/0120185 | A1 | 5/2013 | Kishigami et al. | |
| 2013/0127655 | A1 * | 5/2013 | Kishigami | G01S 7/288 342/152 |
| 2013/0135140 | A1 * | 5/2013 | Kishigami | G01S 7/282 342/189 |
| 2013/0147655 | A1 * | 6/2013 | Kishigami | G01S 13/284 342/135 |
| 2014/0062763 | A1 * | 3/2014 | Kishigami | G01S 13/42 342/158 |
| 2014/0085127 | A1 * | 3/2014 | Kishigami | G01S 13/91 342/108 |
| 2014/0111367 | A1 * | 4/2014 | Kishigami | G01S 7/2813 342/21 |

FOREIGN PATENT DOCUMENTS

| | | |
|---|---|---|
| JP | 2009-080024 A | 4/2009 |
| JP | 2012-032229 A | 2/2012 |
| JP | 2012-052920 A | 3/2012 |
| JP | 2012-225688 A | 11/2012 |
| WO | 2013/024583 A1 | 2/2013 |

OTHER PUBLICATIONS

Morita et al., "A study of pulse compression code modulation scheme for 79GHz band radar system," Proceedings of the 2012 IEICE General Conference, Kiso, Kyokai, Mar. 22, 2012, p. 284.

Spano et al., "Sequences of Complementary Codes for the Optimum Decoding of Truncated Ranges and High Sidelobe Suppression Factors for ST/MST Radar Systems," IEEE Transactions on Geoscience and Remote Sensing 34(2):330-345, 1996.

* cited by examiner

RADAR APPARATUS

TECHNICAL FIELD

The present disclosure relates to a radar apparatus which transmits a radio-frequency signal (e.g., microwave signal or millimeter wave signal).

BACKGROUND ART

Radar apparatus transmit a radio-frequency radar transmission signal from a measuring site, receive a reflection wave signal reflected from a target, and measure at least one of a distance between the measuring site and the target and a direction of the target.

In radar apparatus which generate a radar transmission signal using, for example, a pulse code, interference may occur in the radar apparatus due to reception of a reflection wave signal of a radar transmission signal that was transmitted in a transmission cycle that is different from (e.g., one cycle or two cycles before) the transmission cycle of a radar transmission signal concerned.

For example, Patent document 1 discloses a radar signal transmission method which causes each radar transmitter to transmit a pulse signal that has been interpulse-modulated according to a first code given to the radar transmitter, the first code being different from first codes given to other ones of plural radar transmitters. This method lowers the degree of interference in the radar system.

RELATED ART DOCUMENTS

Patent Documents

Patent document 1: JP-A-2004-271529

SUMMARY OF THE INVENTION

Problem to be Solved by the Invention

The present inventors studied radar apparatus which transmit a radio-frequency signal (e.g., microwave signal or millimeter wave signal). However, in Patent document 1, no consideration is given to technical measures against interference that may occur in a case that phase rotation occurs in a reception signal due to a Doppler frequency variation (e.g., in a case that a target moves during a measurement). In conventional radar apparatus, the correlation characteristic of a reception signal is degraded in the case where phase rotation occurs in a reception signal due to a Doppler frequency variation.

The present disclosure has been made to solve the above-described problem, and an object of the disclosure is therefore to provide a radar apparatus which suppresses interference in a reception signal even in the case where phase rotation occurs in a reception signal due to a Doppler frequency variation.

Means for Solving the Problem

The present disclosure provides a radar apparatus including: a transmission signal generating unit which generates a transmission signal by multiplying one (selected in prescribed order) of $2^{N+1}$ (N: an integer of 1 or more) codes of a Spano code sequence by one code (selected in prescribed order), having a length 1, of one of a first code or a second code each having a code length $2^{N+1}$ in every transmission cycle; and a transmission RF unit converts the transmission signal into a radio-frequency radar transmission signal and transmits it from a transmission antenna, wherein as for codes used in adjacent two transmission cycles for two times $2^{N+1}$ transmission cycles, the sum total of inner products of codes having a length 1 of the first code, inner products of codes having a length 1 of the second code, and inner products of codes of the first code and the second code becomes equal to 0.

Advantages of the Invention

According to the present disclosure, interference in a reception signal can be suppressed even in the case where phase rotation occurs in a reception signal due to a Doppler frequency variation.

MODE FOR CARRYING OUT THE INVENTION

Background of Embodiments

Figure 1:
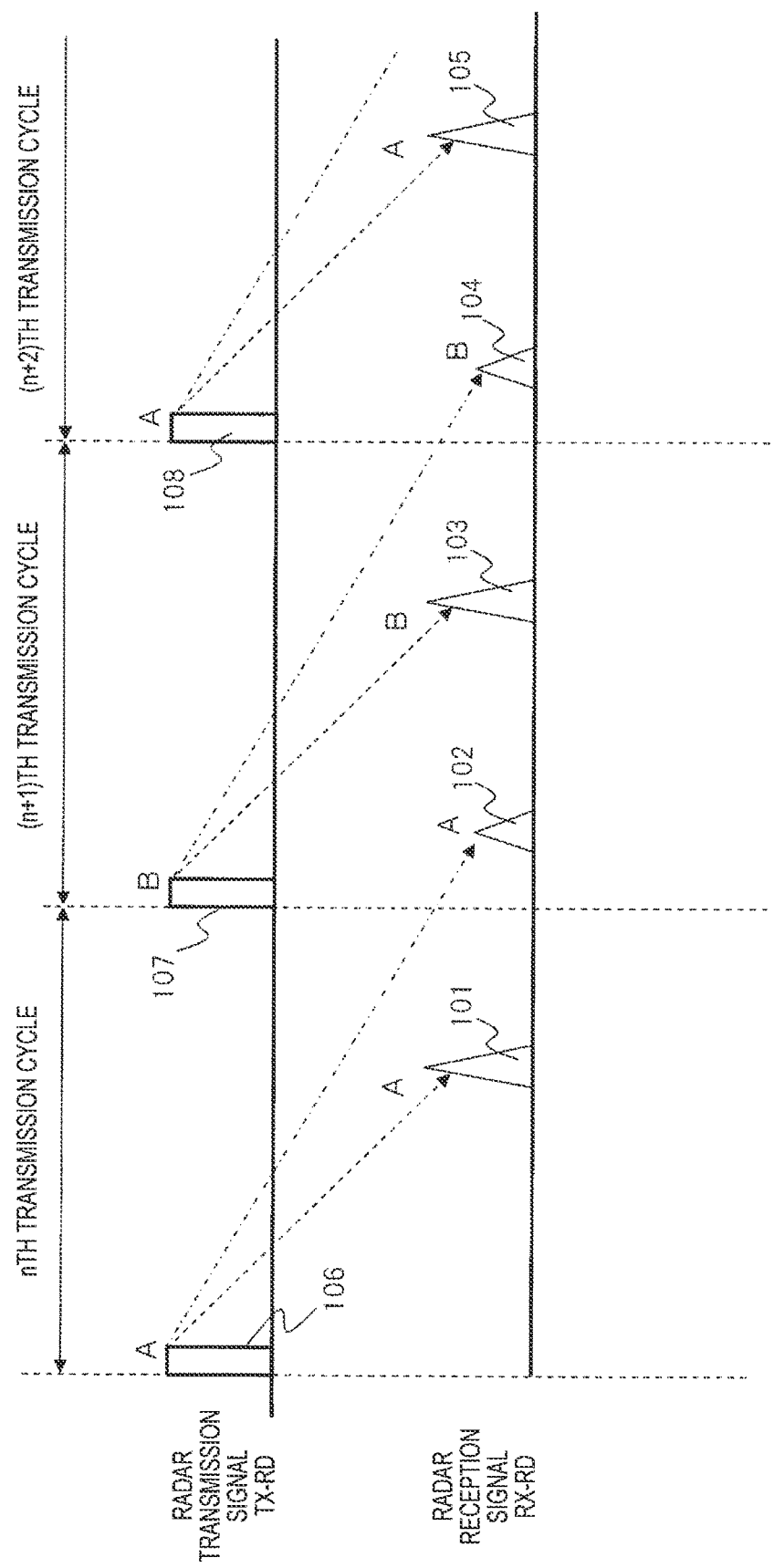
FIG. 1 illustrates interference that occurs due to a reflection wave signal that is received in a transmission cycle that is next to the transmission cycle of a radar transmission signal transmitted by a radar apparatus.
Figure 2:
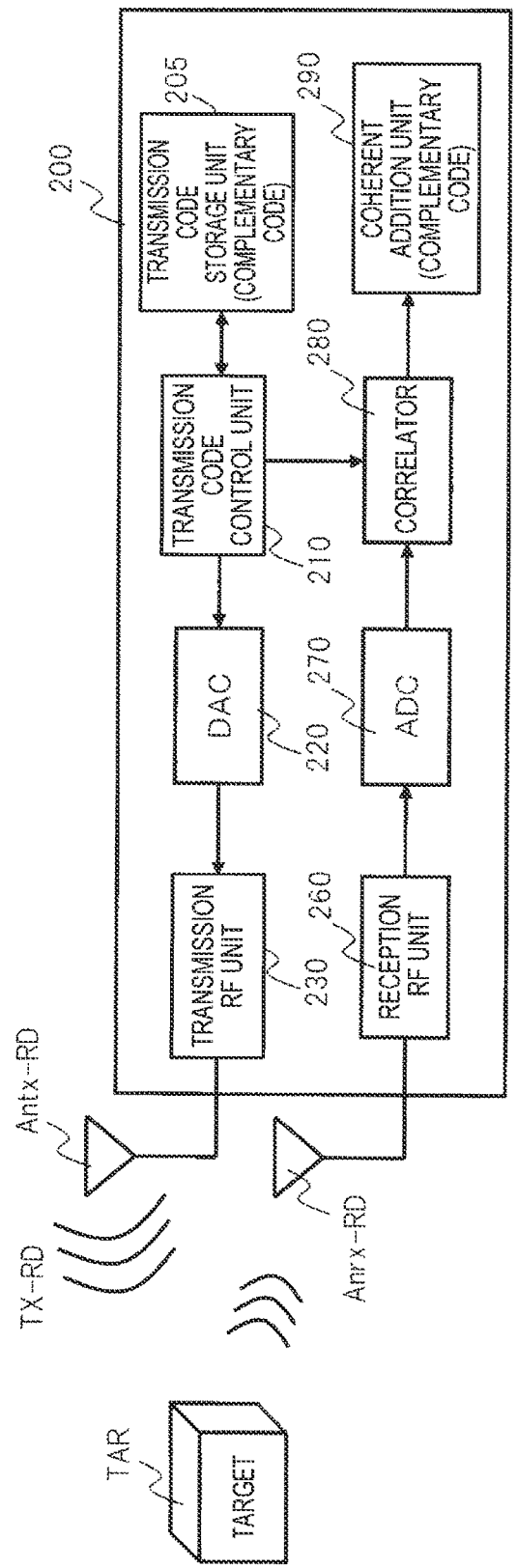
FIG. 2 is a block diagram of a conventional radar apparatus having a first example configuration.
Figure 3:
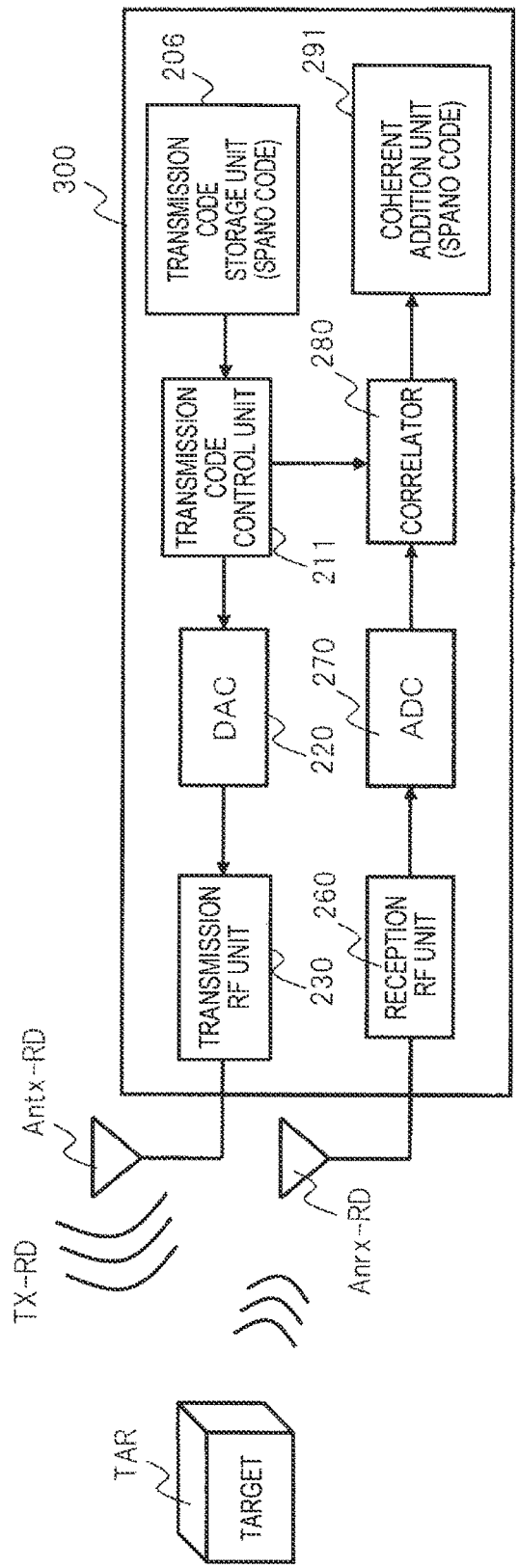
FIG. 3 is a block diagram of another conventional radar apparatus having a second example configuration.
Figure 4B:
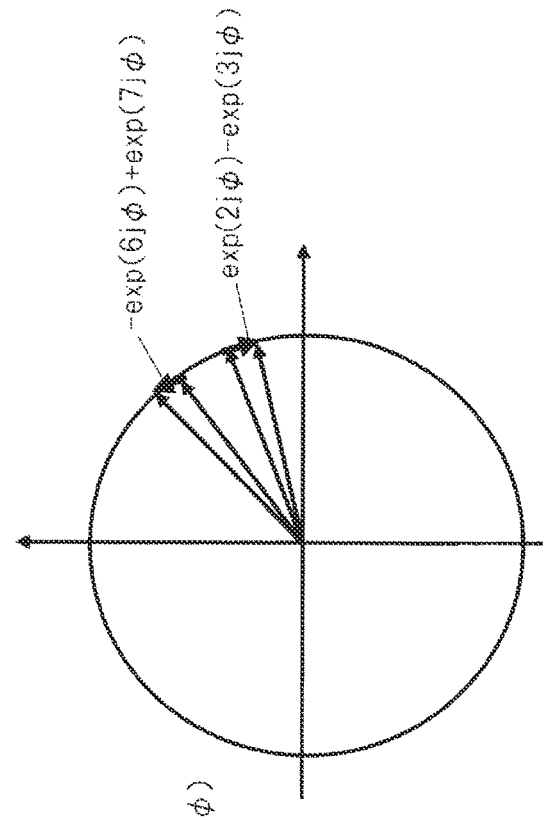
FIGS. 4(A) and 4(B) illustrate cancellation of phase rotations that are caused by a Doppler frequency variation.
Figure 4A:
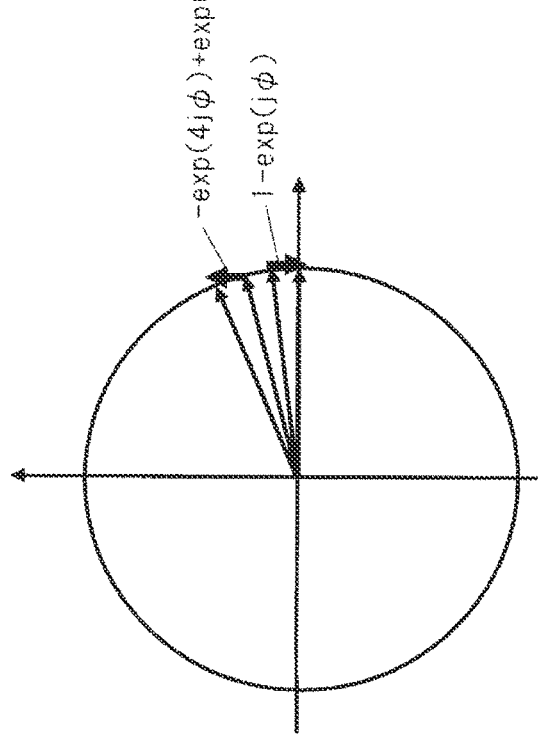

First, before the description of radar apparatus according to embodiments of the present disclosure, problems of conventional radar apparatus will be described with reference to FIGS. 1 to 4. FIG. 1 illustrates interference that occurs due to a reflection wave signal that is received in a transmission cycle that is next to the transmission cycle of a radar transmission signal transmitted by a radar apparatus. FIG. 2 is a block diagram of a conventional radar apparatus 200 having a first example configuration. FIG. 3 is a block diagram of a conventional radar apparatus 300 having a second example configuration. FIGS. 4(A) and 4(B) illustrate cancellation of a phase rotation that is caused by a Doppler frequency variation.

In the following description, the term "complementary code" means a two-system code which uses a pair of codes $A_n$ and $B_n$ and has a feature that the sums of autocorrelation values, having the same delay time τ (s), of autocorrelation results of the respective codes $A_n$ and $B_n$ have no sidelobes except the sum of peak autocorrelation values. Parameter n=1, 2, ..., L (code length). In the following description, parameter n will be omitted and expressions "code A" and "code B" will be used.

In an nth transmission cycle shown in FIG. 1, the radar apparatus transmits a radar transmission signal TX-RD 106 that is generated using the one code A of the pair of codes of the complementary code (A, B). In an (n+1)th transmission cycle shown in FIG. 1, the radar apparatus transmits a radar transmission signal TX-RD 107 that is generated using the other code B of the pair of codes of the complementary code (A, B). In (n+2)th and following transmission cycles shown in FIG. 1, the radar apparatus alternately transmits, as radar transmission signals TX-RD 108, the same radar transmission signals as in the nth and (n+1)th transmission cycles in units of two transmission cycles.

For example, a reflection wave signal 102 that is produced as a result of reflection by a target of a radar transmission signal TX-RD 106 transmitted by the radar apparatus in the nth transmission cycle is received in the (n+1)th transmission cycle as well as in the nth transmission cycle (see FIG. 1).

In the (n+1)th transmission cycle, the radar apparatus generates the radar transmission signal TX-RD 107 using the transmission code B. Therefore, the reflection wave signal 102 of the radar transmission signal TX-RD 106 that was generated in the nth transmission cycle using the transmission code A is received in the (n+1)th transmission cycle to cause interference with a reflection wave signal 103.

For example, the radar apparatus obtains a sidelobes-suppressed correlation characteristic by adding up sets of autocorrelation values between the radar transmission signals TX-RD 106 and 107 that were transmitted by itself in the nth and (n+1)th transmission cycles (two transmission cycles) and the reception wave signals 101-103 reflected from the target and received in the nth and (n+1)th transmission cycles.

Therefore, when the radar apparatus receives the interference-causing reflection wave signal 102 in the (n+1)th transmission cycle, the reception signal correlation characteristic of the radar apparatus is degraded and the target detection accuracy of the radar apparatus is lowered.

Although not described in detail, when a reflection wave signal 104 produced by reflection by the target of the radar transmission signal TX-RD 107 that was transmitted in the (n+1)th transmission cycle shown in FIG. 1 is received in the (n+2)th transmission cycle, it causes interference with a reflection wave signal 105.

Next, how the conventional first example radar apparatus is configured and operates will be described with reference to FIG. 2.

The radar apparatus 200 shown in FIG. 2 includes a transmission code storage unit (complementary code) 205, a transmission code control unit 210, a DAC (digital-to-analog converter) 220, a transmission RF unit 230 to which a transmission antenna Antx-RD is connected, a reception RF unit 260 to which a reception antenna Anrx-RD is connected, an ADC (analog-to-digital converter) 270, a correlator 280, and a coherent addition unit (complementary code) 290.

The transmission code storage unit (complementary code) 205 stores, for example, a pair of codes A and B of a complementary code (A, B) as transmission codes to be used by the radar apparatus 200 to generate a radar transmission signal TX-RD.

The transmission code control unit 210 refers to the transmission code storage unit (complementary code) 205 and reads out the codes A and B alternately in units of one transmission cycle of a radio-frequency radar transmission signal RX-RD. The transmission code control unit 210 generates a transmission signal which is a pulse compression code using the code A or B that is read out in every transmission cycle, and outputs it to the DAC 220 and the correlator 280.

The DAC 220 D/A-converts the digital transmission signal that is output from the transmission code control unit 210 into an analog transmission signal and outputs the latter to the transmission RF unit 230. The transmission RF unit 230 converts the transmission signal that is output from the DAC 220 into a radio-frequency radar transmission signal TX-RD using a local signal that is output from a local signal oscillator (not shown), and transmits the latter from the transmission antenna Antx-RD.

The reception RF unit 260 receives, through the reception antenna Anrx-RD, a radar transmission signal as reflected by a target TAR, converts the radio-frequency reception signal received through the reception antenna Anrx-RD into a baseband reception signal using the local signal that is output from the local signal oscillator (not shown), and outputs the latter to the ADC 270. The ADC 270 A/D-converts the analog baseband reception signal that is output from the reception RF unit 260 into a digital baseband reception signal, and outputs the latter to the correlator 280.

The correlator 280 calculates, in every transmission cycle, autocorrelation values between the transmission signal generated by the transmission code control unit 210 and the reception signal that is output from the ADC 270, and outputs the calculated autocorrelation values to the coherent addition unit (complementary code) 290.

The coherent addition unit (complementary code) 290 adds up sets of autocorrelation values that have been calculated by the correlator 280 in a prescribed coherent addition number (e.g., the number (two) of codes constituting the complementary code or a multiple of that number) of transmission cycles, and measures a distance between the target TAR and the radar apparatus 200 on the basis of a time corresponding to a peak autocorrelation value.

In a static environment (e.g., the target TAR does not move), because of the use of the complementary code as the transmission codes, the radar apparatus 200 shown in FIG. 2 produces a sidelobes-suppressed correlation characteristic on the basis of a result of addition processing of the coherent addition unit (complementary code) 290.

However, where phase rotation occurs in a reception signal due to a Doppler frequency variation (e.g., the target moves during a measurement), the radar apparatus 200 which uses the complementary code may have difficulty obtaining a sidelobes-suppressed correlation characteristic depending on an addition processing result of the coherent addition unit (complementary code) 290.

Next, how the conventional second example radar apparatus 300 is configured and operates will be described with reference to FIG. 3.

Whereas the radar apparatus 200 shown in FIG. 2 generates a transmission signal using one of the pair of codes of the complementary code (A, B), the radar apparatus 300 shown in FIG. 3 generates a transmission signal in every transmission cycle using one code of a Spano code sequence (A, B, B', A', B, A, A', B') (described later) in this order. Items of the configuration and operation of the radar apparatus 300 shown in FIG. 3 having the same ones in the radar apparatus 200 shown in FIG. 2 will not be described; different items will be described.

The radar apparatus 300 shown in FIG. 3 includes a transmission code storage unit (Spano code) 206, a transmission code control unit 211, a DAC 220, a transmission RF unit 230 to which a transmission antenna Antx-RD is connected, a reception RF unit 260 to which a reception antenna Anrx-RD is connected, an ADC 270, a correlator 280, and a coherent addition unit (Spano code) 291.

The transmission code storage unit (Spano code) 206 stores, for example, a 4-code sequence (A, B, A', B') of an 8-code sequence (A, B, B', A', B, A, A', B') of a Spano code sequence which is formed on the basis of a complementary code (A, B) as codes to be used by the radar apparatus 300 to generate a radar transmission signal TX-RD.

The Spano code sequence is a code sequence which includes the codes A and B constituting the complementary code (A, B) and order-reversed codes A' and B' of the respective codes A and B, and includes, for example, eight codes arranged in order of (A, B, B', A', B, A, A', B'). Generating a transmission signal in every transmission cycle using one code of the Spano code sequence (A, B, B', A', B, A, A', B') in this order, the radar apparatus 300 shown in FIG. 3 can obtain a sidelobes-suppressed correlation characteristic even in the case where phase rotation occurs in a reception signal due to a Doppler frequency variation (e.g., the target moves during a measurement), as described later with reference to FIG. 4.

The transmission code control unit 211 refers to the transmission code storage unit (Spano code) 206 and reads out one code of the Spano code sequence (A, B, B', A', B, A, A', B') in this order in every transmission cycle of a radio-frequency radar transmission signal TX-RD. The transmission code control unit 211 generates a transmission signal which is a pulse compression code using the one code that is read out in every transmission cycle, and outputs it to the DAC 220 and the correlator 280.

The coherent addition unit (Spano code) 291 adds up sets of autocorrelation values that have been calculated by the correlator 280 in a prescribed coherent addition number (e.g., the number (8) of codes constituting the Spano code sequence or a multiple of 8) of transmission cycles, and measures a distance between the target TAR and the radar apparatus 300 on the basis of a time corresponding to a peak autocorrelation value.

A description will be made of a mechanism for suppressing sidelobes in a coherent addition result even if phase rotation occurs in a reception signal due to a Doppler frequency variation in the case where the radar apparatus 300 shown in FIG. 3 generates a transmission signal using one code of the Spano code sequence (A, B, B', A', B, A, A', B').

For example, assume that the codes constituting the complementary code (A, B) are A=[+1, −1, −1, −1] and B=[+1, −1, +1, −1]. The code A has autocorrelation values A#A [4, 1, 0, −1] (i.e., autocorrelation values between a transmission signal generated using the code A and a baseband-processed reception signal received as a result of reflection by a target TAR of a radar transmission signal generated by converting the transmission signal into a radio-frequency band). Likewise, the code B has autocorrelation values B#B [4, −1, 0, 1]. Symbol A#A represents autocorrelation values of the code A. In each set of autocorrelation values, the value "4" is a main lobe component.

The sidelobe components of the autocorrelation values A#A and B#B are [1, 0, −1] and [−1, 0, 1], respectively. The former is represented by a vector r, the latter is represented by a vector −r. The sidelobe components of the autocorrelation values of the code A' are represented by r', and those of the code B' are represented by −r'.

For example, in a static environment, in the radar apparatus 200 shown in FIG. 2, since the complementary code is used as the transmission codes, the sidelobe components become zero (r+(−r)=0) when the coherent addition unit (complementary code) 290 performs coherent addition processing on sets of autocorrelation values obtained in two transmission cycles.

Likewise, in the radar apparatus 300 shown in FIG. 3, since the Spano code is used as the transmission codes, the sidelobe components become zero (r+(−r)+(−r')+r'+r+(−r)+r'+(−r')=0), that is, they are suppressed, when the coherent addition unit (Spano code) 291 performs coherent addition processing on sets of autocorrelation values obtained in eight transmission cycles.

Next, in a case that the target TAR is moving (not in a static environment), a phase rotation $\phi$ occurs in a reception signal due to a Doppler frequency variation. Although the Doppler phase rotation $\phi$ is as small as about 1° to 2° or smaller, influences of Doppler phase rotations on reception signals need to be taken into consideration when the coherent addition number of the coherent addition unit (Spano code) 291 is large (e.g., about 100). As for the influence of the Doppler phase rotation $\phi$, a coefficient $\exp((n-1)j\phi)$ is given to a reception signal when a Doppler phase rotation $\phi$ occurs in an nth transmission cycle (n is an integer that is larger than or equal to 2).

For example, when the target TAR is moving, in the radar apparatus 200 shown in FIG. 2, the sidelobe components of autocorrelation values in a first transmission cycle are r but those of autocorrelation values in a second transmission cycle are $-r \cdot \exp(j\phi)$. Therefore, when the coherent addition unit (complementary code) 290 performs coherent addition processing on sets of autocorrelation values obtained in two transmission cycles, the sidelobe components do not become zero and, instead, become equal to $r-r \cdot \exp(j\phi)$. Thus, the sidelobes are not suppressed to degrade the correlation characteristic of a reception signal.

Likewise, in the radar apparatus 300 shown in FIG. 3, the sidelobe components of sets of autocorrelation values in first to eighth transmission cycles become r, $r \cdot \exp(j\phi)$, $r \cdot \exp(2j\phi)$, $r \cdot \exp(3j\phi)$, $r \cdot \exp(4j\phi)$, $r \cdot \exp(5j\phi)$, $r \cdot \exp(6j\phi)$, $r \cdot \exp(7j\phi)$, respectively. An addition processing result of the sidelobe components of sets of autocorrelation values in the first, second, fifth, and sixth transmission cycles are given by Formula (1):

[Formula 1]

$$\{1 - \exp(j\phi) - \exp(4j\phi) + \exp(5j\phi)\} \qquad (1)$$

Formula (1) includes the sum of $\{1-r \cdot \exp(j\phi)\}$ and $\{-r \cdot \exp(4j\phi)+r \cdot \exp(5j\phi)\}$. Since the Doppler phase rotation $\phi$ is very small, $\{1-r \cdot \exp(j\phi)\}$ and $\{-r \cdot \exp(4j\phi)+r \cdot \exp(5j\phi)\}$ can be approximated to be vectors that are opposite in direction and identical in magnitude (see FIG. 4(A)). Therefore, Formula (1) can be approximated to be 0.

Likewise, an addition processing result of the sidelobe components of sets of autocorrelation values in the third, fourth, seventh, and eighth transmission cycles are given by Formula (2):

[Formula 2]

$$r\{-\exp(2j\phi) + \exp(3j\phi) + \exp(6j\phi) - \exp(7j\phi)\} \qquad (2)$$

Formula (2) includes the sum of $\{-r \cdot \exp(2j\phi)+r \cdot \exp(3j\phi)\}$ and $\{r \cdot \exp(6j\phi)-r \cdot \exp(7j\phi)\}$. Since the Doppler phase rotation $\phi$ is very small, $\{-r \cdot \exp(2j\phi)+r \cdot \exp(3j\phi)\}$ and $\{r \cdot \exp(6j\phi)-r \cdot \exp(7j\phi)\}$ can be approximated to be vectors that are opposite in direction and identical in magnitude (see FIG. 4(B)). Therefore, Formula (2) can be approximated to be 0.

Therefore, in the radar apparatus 300 shown in FIG. 3, when the coherent addition unit (Spano code) 291 performs coherent addition processing on sets of autocorrelation values in eight transmission cycles (eight is equal to the number of codes of the Spano code sequence), the sidelobe components given by each of Formulae (1) and (2) can be approximately to be 0. Thus, the sidelobes are suppressed, that is, the correlation characteristic of a reception signal is not degraded by virtue of the characteristics of the Spano code sequence.

As described above, even in the case where the target TAR is moving (i.e., even in a non-static environment), degradation of the correlation characteristic of a reception signal can be suppressed when the radar apparatus 300 generates transmission signals using the Spano code sequence and performs coherent addition processing on sets of autocorrelation values in eight or multiple-of-eight transmission cycles (eight is equal to the number of codes of the Spano code sequence).

Although as above described above the correlation characteristic of a reception signal is not degraded even in the case where the target TAR is moving, the above description does not provide a sufficient technical measure against interference that occurs when a reflection wave signal that is produced as a result of reflection by the target of a radar transmission signal TX-RD transmitted in an nth transmission cycle is received in an (n+1)th transmission cycle instead of the nth transmission cycle.

In view of the above, the following embodiments will be directed to example radar apparatus which does not degrade the correlation characteristic of a reception signal and suppresses interference in a reception signal even in the case where phase rotation occurs in a reception signal due to a Doppler frequency variation.

DESCRIPTION OF EMBODIMENT

Next, a radar apparatus according to an embodiment of the disclosure will be described with reference to the drawings. The radar apparatus 100 according to the embodiment transmits a radio-frequency radar transmission signal TX-RD to a target TAR and measures a distance between the radar apparatus 100 on the basis of a reflection wave signal that is produced as a result of reflection of the radar transmission signal TX-RD by the target TAR.

Figure 5:
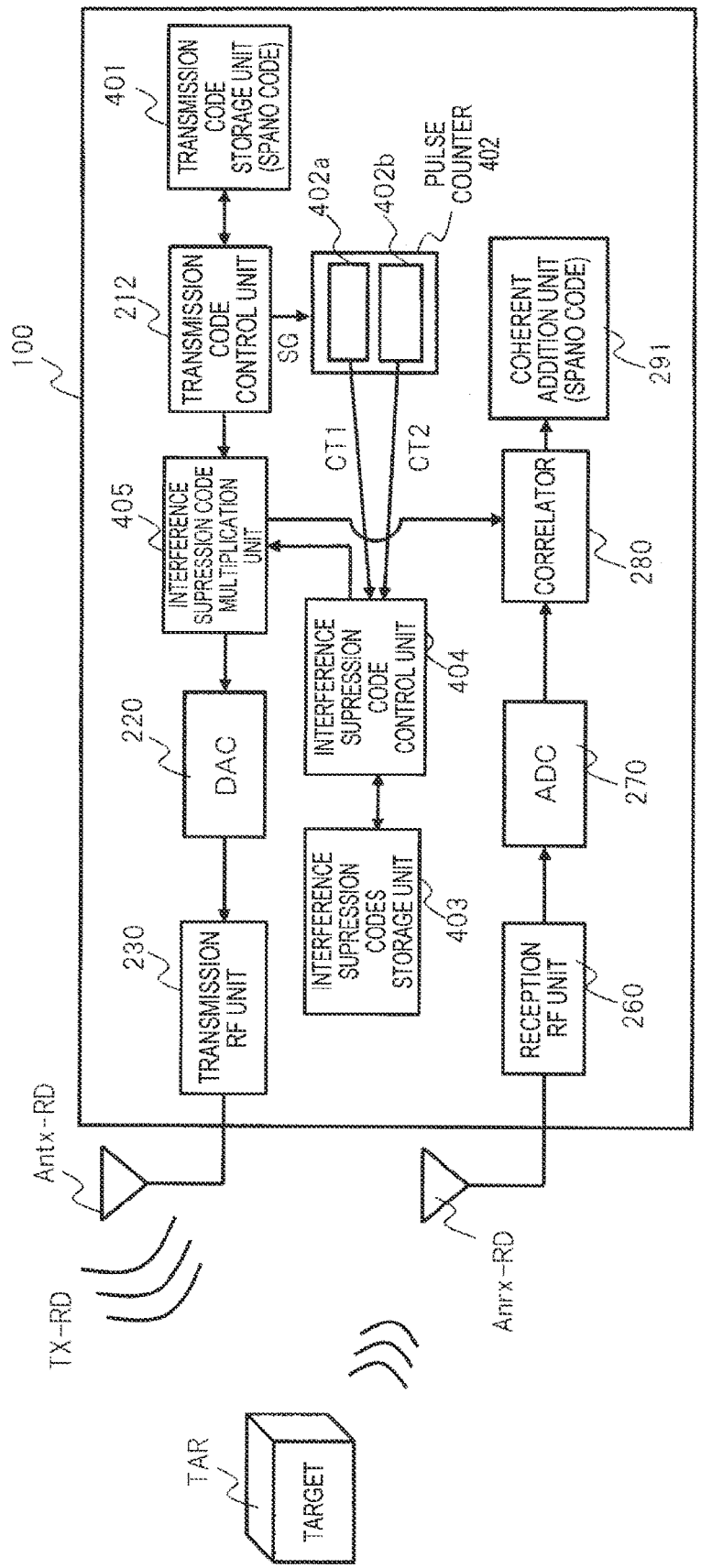
FIG. 5 is a block diagram showing the internal configuration of a radar apparatus according to an embodiment.
Figure 6:
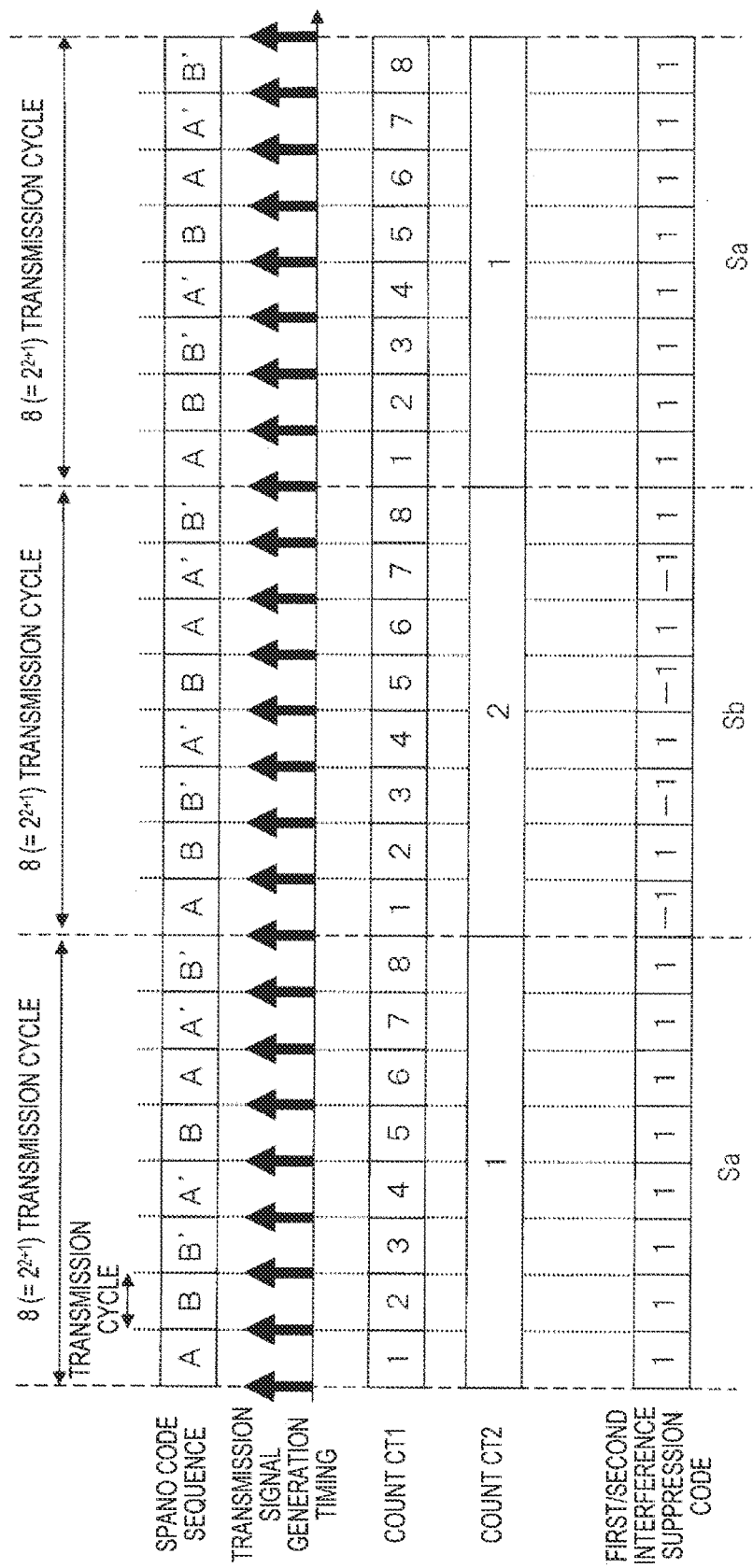
FIG. 6 shows example relationships between a Spano code sequence, pulse timing, counts, and interference suppression codes.

FIG. 5 is a block diagram showing the internal configuration of the radar apparatus 100 according to the embodiment. FIG. 6 shows example relationships between a Spano code sequence, pulse timing, counts CT1 and CT2, a first interference suppression code Sa, and a second interference suppression code Sb.

In the embodiment, for example, the radar apparatus 100 generates a transmission signal by multiplying one (selected in prescribed order) of eight ($=2^{2+1}$) codes of a Spano code sequence (A, B, B', A', B, A, A', B') by one code (selected in prescribed order), having a length 1, of one of a first interference suppression code (described later) and a second interference suppression code (described later) each having a code length 8 ($=2^{2+1}$) in every transmission cycle of a radar transmission signal TX-RD.

In the embodiment, the radar apparatus 100 generates a transmission code in every transmission cycle using one of the eight codes of the Spano code sequence (A, B, B', A', B, A, A', B') in this order. As a result, in the radar apparatus 100 according to the embodiment, by virtue of the above-described characteristics of the Spano code sequence, degradation of the correlation characteristic of a reception signal can be suppressed over a total of 16 transmission cycles (16 is two times the number (8) of codes of the Spano code sequence) both in a static environment and in an environment in which phase rotation occurs in a reception signal due to a Doppler frequency variation because the target TAR is moving.

The radar apparatus 100 shown in FIG. 5 includes a transmission code storage unit (Spano code) 401, a transmission code control unit 212, a pulse counter 402, an interference suppression codes storage unit 403, an interference suppression code control unit 404, an interference suppression code multiplication unit 405, a DAC 220, a transmission RF unit 230 to which a transmission antenna Antx-RD is connected, a reception RF unit 260 to which a reception antenna Anrx-RD is connected, an ADC 270, a correlator 280, and a coherent addition unit (Spano code) 291. The pulse counter 402 includes two pulse counters 402a and 402b. A transmission signal generating unit can be formed by using at least the transmission code storage unit (Spano code) 401, the interference suppression codes storage unit 403, and the interference suppression code multiplication unit 405.

The transmission code storage unit (Spano code) 401 stores, for example, a 4-code sequence (A, B, A', B') of a Spano code sequence (A, B, B', A', B, A, A', B') as codes to be used by the radar apparatus 100 to generate a radar transmission signal TX-RD.

The transmission code control unit 212 outputs a transmission signal generation timing signal SG to the pulse counter 402 (more specifically, two pulse counters 402a and 402b) in every transmission cycle of a radio-frequency radar transmission signal TX-RD.

The transmission code control unit 212 reads, as a transmission code, one code of the Spano code sequence (A, B, B', A', B, A, A', B') from the transmission code storage unit (Spano code) 401 in this order in every transmission cycle of a radio-frequency radar transmission signal TX-RD in response to a transmission signal generation timing signal SG, and outputs the read-out code to the interference suppression code multiplication unit 405.

The pulse counter 402a increments a count CT1 in response to a generation timing signal SG supplied from the transmission code control unit 212, and outputs the resulting count CT1 to the interference suppression code control unit 404. The count CT1 varies from "1" to "8" (integers) repeatedly in such a manner as to return to "1" after "8," and corresponds to the transmission cycle of a radar transmission signal TX-RD one to one. For example, in FIG. 6, the count CT1 becomes "1" in a first (leftmost) transmission cycle of a radar transmission signal TX-RD, becomes "8" in an eighth transmission cycle of a radar transmission signal TX-RD, and again becomes "1" in a ninth transmission cycle of a radar transmission signal TX-RD.

The pulse counter 402b increments a count CT2 when it has received a generation timing signal SG eight times from the transmission code control unit 212, and outputs the resulting count CT2 to the interference suppression code control unit 404. The count CT2 becomes "1" and "2" alternately and corresponds to the set of eight transmission cycles of radar transmission signals TX-RD one to one. For example, in FIG. 6, the count CT2 becomes "1" in the first to eighth transmission cycles of radar transmission signals TX-RD, becomes "2" in ninth to 16th transmission cycles of radar transmission signals TX-RD, and again becomes "1" in 17th to 24th transmission cycles of radar transmission signals TX-RD.

The interference suppression codes storage unit 403 which is a multiplication codes storage unit stores a first interference suppression code Sa and a second interference suppression code Sb each having a code length 8 ($=2^{2+1}$). In the embodiment, the first interference suppression code Sa and the second interference suppression code Sb are vectors each having a length 8 and are, for example, given by Sa=[1, 1, 1, 1, 1, 1, 1, 1]
Sb=[−1, 1, −1, 1, −1, 1, −1, 1]
(see FIG. 6).

In the following description, a kth code of the first interference suppression code Sa having a code length 8 is represented by Sa(k) and a kth code of the second interference suppression code Sb having a code length 8 is represented by Sb(k). For example, Sa(1) and Sb(1) are "1" and "−1," respectively. Symbol k is an integer and varies from "1" to "8," and symbols $k_{min}$ and $k_{max}$ have values "1" and "8," respectively.

In the embodiment, the first interference suppression code Sa and the second interference suppression code Sb are used alternately in units of eight ($=2^{2+1}$) transmission cycles. As for codes used in individual pairs of adjoining ones of two times eight ($=2^{2+1}$) transmission cycles, the sum total of (term 11) inner products of first interference suppression codes Sa(k) and Sa(k+1) (k=1 to 7);

(term 21) an inner product of the first interference suppression code Sa($k_{max}$) and the second interference suppression code Sb($k_{min}$);

(term 31) inner products of second interference suppression codes Sb(k) and Sb(k+1) (k=1 to 7); and (term 41) an inner product of the second interference suppression code Sb($k_{max}$) and the first interference suppression code Sa($k_{min}$)

is equal to 0. That is, the first interference suppression code Sa and the second interference suppression code Sb are codes that satisfy Equation (3).

[Formula 3]

$$\sum_{k=1}^{2^{N+1}} (Sa(k) \times Sa(k+1)) + Sa(k\max) \times Sb(k\min) + \sum_{k=1}^{2^{N+1}} (Sb(k) \times Sb(k+1)) + Sb(k\max) \times Sa(k\min) = 0 \quad (3)$$

A specific description will be made using the values shown in FIG. 6. Since

Sa=[1, 1, 1, 1, 1, 1, 1, 1]
Sb=[−1, 1, −1, 1, −1, 1, −1, 1], term 11 is calculated as

1·1+1·1+1·1+1·1+1·1+1·1+1·1=7;

term 22 is calculated as

1·(−1)=−1;

term 31 is calculated as (−1)·1+1·(−1)+(−1)·1+1·(−1)+(−1)·1+1·(−1)+(−1)·1=−7; and term 41 is calculated as

1·1=1.

Therefore, the sum of terms 11, 21, 31, and 41 is equal to 0.

That is, Equations (4), (5), and (6) hold. A vector Xa which is given by Equation (5) corresponds to the sum of the inner products of the above-described terms 11 and 21. A vector Xb which is given by Equation (6) corresponds to the sum of the inner products of the above-described terms 31 and 41.

[Formula 4]

$$Xa+Xb=0 \quad (4)$$

[Formula 5]

$$Xa=[Sa(1)\cdot Sa(2), Sa(2)\cdot Sa(3), Sa(3)\cdot Sa(4), Sa(4)\cdot Sa(5), Sa(5)\cdot Sa(6), Sa(6)\cdot Sa(7), Sa(7)\cdot Sa(8), Sa(8)\cdot Sb(1)] \quad (5)$$

[Formula 6]

$$Xb=[Sb(1)\cdot Sb(2), Sb(2)\cdot Sb(3), Sb(3)\cdot Sb(4), Sb(4)\cdot Sb(5), Sb(5)\cdot Sb(6), Sb(6)\cdot Sb(7), Sb(7)\cdot Sb(8), Sb(8)\cdot Sa(1)] \quad (6)$$

The interference suppression code control unit 404 reads a code of the first interference suppression code Sa or the second interference suppression code Sb from the interference suppression codes storage unit 403 according to the counts CT1 and CT2 supplied from the pulse counters 402a and 402b, and outputs the read-out codes to the interference suppression code multiplication unit 405. For example, the interference suppression code control unit 404 reads the first interference suppression code Sa(1) (=1) from the interference suppression codes storage unit 403 when the counts CT1 and CT2 are both "1," and reads the second interference suppression code Sb(1) (=−1) when the counts CT1 and CT2 are "1" and "2," respectively (see FIG. 6).

The interference suppression code multiplication unit 405 which is a multiplication code multiplying unit generates a transmission code by multiplying the transmission code that is output from the transmission code control unit 212 by the first interference suppression code Sa(k) or the second interference suppression code Sb(k) (k is an integer that is one of 1 to 8). The interference suppression code multiplication unit 405 outputs the generated transmission signal to the DAC 220 and the correlator 280. In the embodiment, the interference suppression code multiplication unit 405 generates transmission signals

A, B, B', A', B, A, A', B',
−A, B, −B', A', −B, A, −A', B' in a total of 16 transmission cycles, the number 16 being two times the number (eight) of codes of the Spano code sequence (A, B, B', A', B, A, A', B') (see FIG. 6). It is noted that when A=[+1, −1, −1, −1], −A is [−1, +1, +1, +1].

Even if one of the Spano code sequence is multiplied by a first interference suppression code Sa(k) or a second interference suppression code Sb(k) having the minus sign (e.g., "−1"), it does not cause degradation of the correlation characteristic of a reception signal in the radar apparatus 100. This is also true in each of the following embodiments.

This is explained as follows. When a reflection wave signal produced by reflection by the target TAR of a radar transmission signal TX-RD generated using, for example, "−A" is received, since the correlation calculation has the linear operation properties, relationships (−A)#A=−A#A, A#(−A)=−A#A, and (−A)#(−A)=A#A hold for autocorrelation values and hence minus components are canceled out.

The DAC 220 D/A-converts the digital transmission signal that is output from the interference suppression code multiplication unit 405 into an analog transmission signal and outputs the latter to the transmission RF unit 230. The transmission RF unit 230 converts the transmission signal that is output from the DAC 220 into a radio-frequency radar transmission signal TX-RD using a local signal that is output from a local signal oscillator (not shown), and transmits the latter from the transmission antenna Antx-RD.

The reception RF unit 260 receives, through the reception antenna Anrx-RD, a radar transmission signal as reflected by the target TAR, converts the radio-frequency reception signal received through the reception antenna Anrx-RD into a baseband reception signal using the local signal that is output from the local signal oscillator (not shown), and outputs the latter to the ADC 270. The ADC 270 A/D-converts the analog baseband reception signal that is output from the reception RF unit 260 into a digital baseband reception signal, and outputs the latter to the correlator 280.

The correlator 280 which is a correlation calculating unit calculates, in every transmission cycle, autocorrelation values between the transmission signal generated by the interference suppression code multiplication unit 405 and the reception signal that is output from the ADC 270, and outputs the calculated autocorrelation values to the coherent addition unit (Spano code) 291. The coherent addition unit (Spano code) 291 adds up sets of autocorrelation values that have been calculated by the correlator 280 in a prescribed coherent addition number (e.g., 16 which is two times the number (8) of codes constituting the Spano code sequence) of transmission cycles, and measures a distance between the target TAR and the radar apparatus 100 on the basis of a time corresponding to a peak autocorrelation value.

For example, assume that a reflection wave signal produced as a result of reflection by the target TAR of a radar transmission signal TX-RD transmitted by the radar apparatus 100 in an nth transmission cycle has been received in the (n+1)th transmission cycle (e.g., n is an integer and varies from 1 to 16) instead of the nth transmission cycle. The coherent addition unit (Spano code) 291 outputs the following as an addition processing result of interference components of reception signals that are received in (n+1)th transmission cycles where n=1 to 16:

(A#B)+(B#B')+(B'#A')+(A'#B)+(B#A)+(A#A')+
(A'#B')+(B'#(−A))+((−A)#B)+(B#(−B'))+((−B')
A')+(A'#(−B))+((−B)#A)+(A#(−A'))+((−A')#B')+
(B'#A)

In the above formula, (A#B) represents a correlation operation between codes A and B. For a code element sequence A=[A1, A2~AL] and a code element sequence B=[B1, B2~BL], (A#B) is given by Equation (7):

[Formula 7]

$$A\#B = \left[\sum_{k=1}^{L}(Ak \cdot Bk), \sum_{k=2}^{L}(Ak \cdot Bk - 1), \sim, \sum_{k=L}^{L} Ak \cdot Bk - (L-1)\right] \quad (7)$$

Since the correlation operation is a linear operation, the minus sign can be move to outside the correlation operation; for example, (A#(−B)) can be modified into −(A#B). Therefore, the addition processing result of the interference components of the reception signals that are received in (n+1)th transmission cycles where n=1 to 16 becomes as follows:

(A#B)+(B#B')+(B'#A')+(A'#B)+(B#A)+(A#A')+
(A'#B')−(B'#A')−(A#B)−(B#B')+−(B'#A')−(A'#B)−
(B#A)−(A#−A'))−(A'#B')+(B'#A)=0

Therefore, in the embodiment, no interference occurs in the radar apparatus 100.

As described above, for example, the radar apparatus 100 according to the embodiment generates a transmission code in every transmission cycle of a radar transmission signal TX-RD by multiplying one, selected in prescribed order, of the eight ($=2^{2+1}$) codes of the Spano code sequence (A, B, B', A', B, A, A', B') by one code having a length 1, selected in prescribed order, of one of the first interference suppression code Sa and the second interference suppression code Sb each having a code length 8 ($=2^{2+1}$).

The first interference suppression code Sa and the second interference suppression code Sb are used alternately in units of $2^{N+1}$ transmission cycles. As for codes used in individual pairs of adjoining ones of two times eight ($=2^{2+1}$) transmission cycles, the sum total of (term 12) inner products of first interference suppression codes Sa(k) and Sa(k+1) (k=1 to 7);

(term 22) an inner product of the first interference suppression code Sa($k_{max}$) and the second interference suppression code Sb($k_{min}$);

(term 32) inner products of second interference suppression codes Sb(k) and Sb(k+1) (k=1 to 7); and (term 42) an inner product of the second interference suppression code Sb($k_{max}$) and the first interference suppression code Sa($k_{min}$)

is equal to 0.

Furthermore, the coherent addition unit (Spano code) 291 performs addition processing on sets of autocorrelation values that have been calculated by the correlator 280 in a prescribed coherent addition number (e.g., 16 which is two times the number (8) of codes constituting the Spano code sequence) of transmission cycles.

Operating in the above-described manner, the radar apparatus 100 according to the embodiment can make the sum of interference components of reception signals and thereby suppress interference even in the case where a reflection wave signal produced as a result of reflection by the target TAR of a radar transmission signal TX-RD transmitted in an nth transmission cycle is received in the (n+1)th transmission cycle instead of the nth transmission cycle.

That is, the radar apparatus 100 according to the embodiment can suppress degradation of the correlation characteristic of a reception signal and suppress interference of a reception signal even in the case where phase rotation occurs in a reception signal due to a Doppler frequency variation.

(Example Modifications of First Orthogonal Code Sequence and Second Orthogonal Code Sequence Used in Embodiment 1)

In the first embodiment the first interference suppression code Sa and the second interference suppression code Sb are as follows:
Sa=[1, 1, 1, 1, 1, 1, 1, 1]
Sb=[−1, 1, −1, 1, −1, 1, −1, 1].
They may be replaced by
Sa=[1, 1, −1, −1, 1, 1, −1, −1]
Sb=[1, −1, −1, 1, 1, −1, −1, 1]
which satisfy Equations (4)-(6).

In the embodiment, the set of eight codes
A, B, B', A', B, A, A', B'
is used as an example Spano code and each interference suppression code is superimposed on it (i.e., it is multiplied by each interference suppression code) regarding it as one group.

Alternatively, a modification is possible in which a set of eight codes constituting a Spano code is regarded as two Spano code sequences each being a set of four codes by dividing the former into
a first-half four codes (A, B, B', A') and
a second-half four codes (B, A, A', B'),
and respective interference suppression codes are superimposed on them (i.e., they are multiplied by respective interference suppression codes).

Neither the first-half four codes nor the second-half four codes have the above-described features of the Spano code which is a set of eight codes. However, by performing superimposition of (multiplication by) the first-half four codes and thereafter performing superimposition of (multiplication by) the second-half four codes, an interference signal component suppressing effect and a sidelobe suppression characteristic can be obtained that are equivalent to those obtained in the case that each interference suppression code is superimposed on the above-described Spano code which is a set of eight codes (i.e., the latter is multiplied by the former).

For example, the radar apparatus 100 uses a first-half four codes (A, B, B', A') and a second-half four codes (B, A, A', B') which are obtained by dividing the Spano code used in the embodiment which is a set of eight codes.

When the radar apparatus 100 uses interference suppression codes (1, 1, 1, 1) and (−1, 1, −1, 1), transmission pulses (transmission signals)

(A, B, B', A'),
(−A, B, −B', A'),
(B, A, A', B'), and
(−B, A, −A', B')

are transmitted from the radar apparatus 100.

Modification of Embodiment 1

In the embodiment, the error of a transmitted radio-frequency signal or a received radio-frequency signal can be reduced by utilizing phase rotation. For example, as for transmission phase rotation, every time two transmission pulses are transmitted, a phase rotation of 90° is given to them progressively. As for reception phase rotation, every time two transmission pulses have been transmitted, a phase rotation of −90° is given to resulting reception pulses progressively in link with the two transmission pulses.

Figure 9:
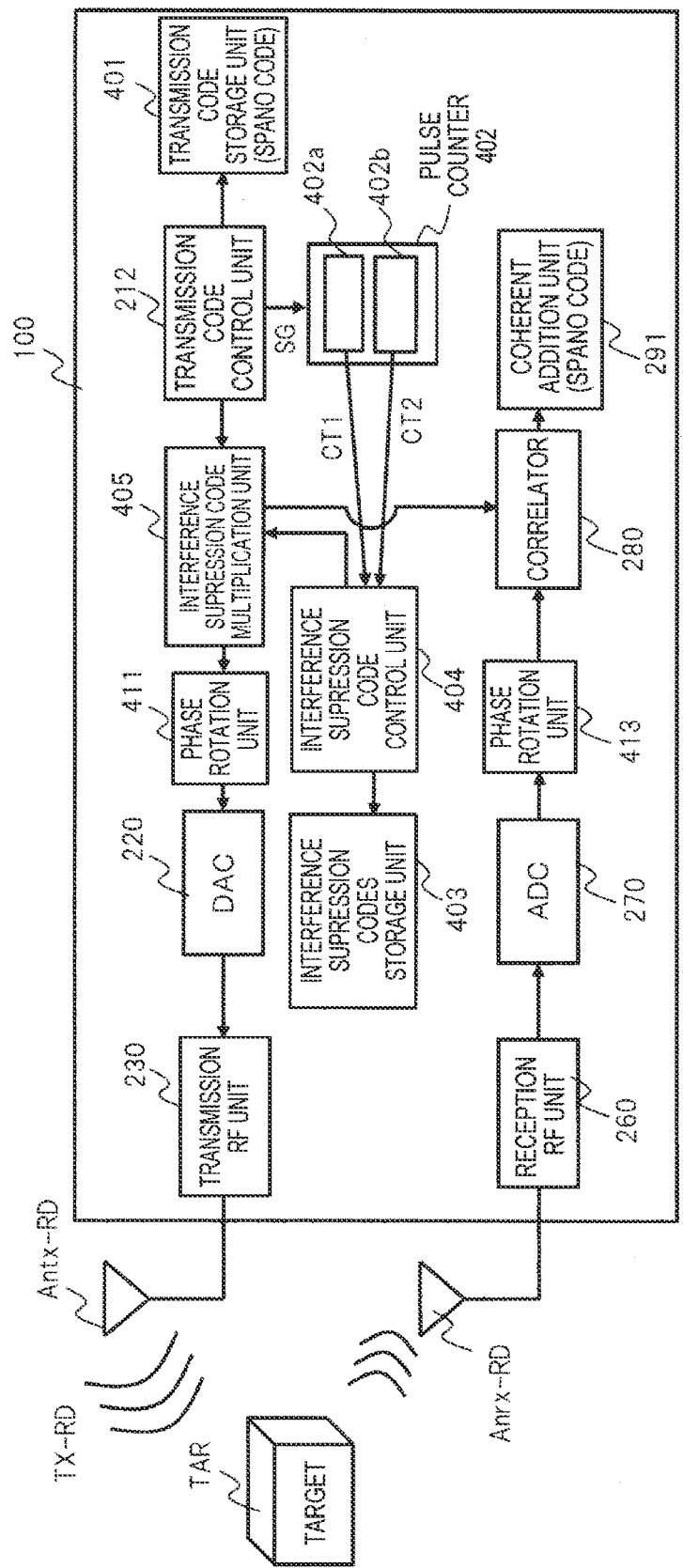
FIG. 9 is a block diagram showing the internal configuration of a radar apparatus according to a modification of the first embodiment.

A more specific configuration will be described with reference to FIG. 9. FIG. 9 is a block diagram showing the internal configuration of a radar apparatus 100 according to a modification of the first embodiment. In the radar apparatus 100 shown in FIG. 9, a phase rotation unit 411 is disposed upstream of the DAC 220 and a phase rotation unit 413 is disposed downstream of the ADC 270.

The phase rotation unit 411 gives a phase rotation of 90° to outputs of the interference suppression code multiplication unit 405 progressively every time two transmission pulses are transmitted. The phase rotation unit 413 gives a phase rotation of −90° to outputs of the ADC 270 progressively every time two reception pulses are received.

Figure 8:
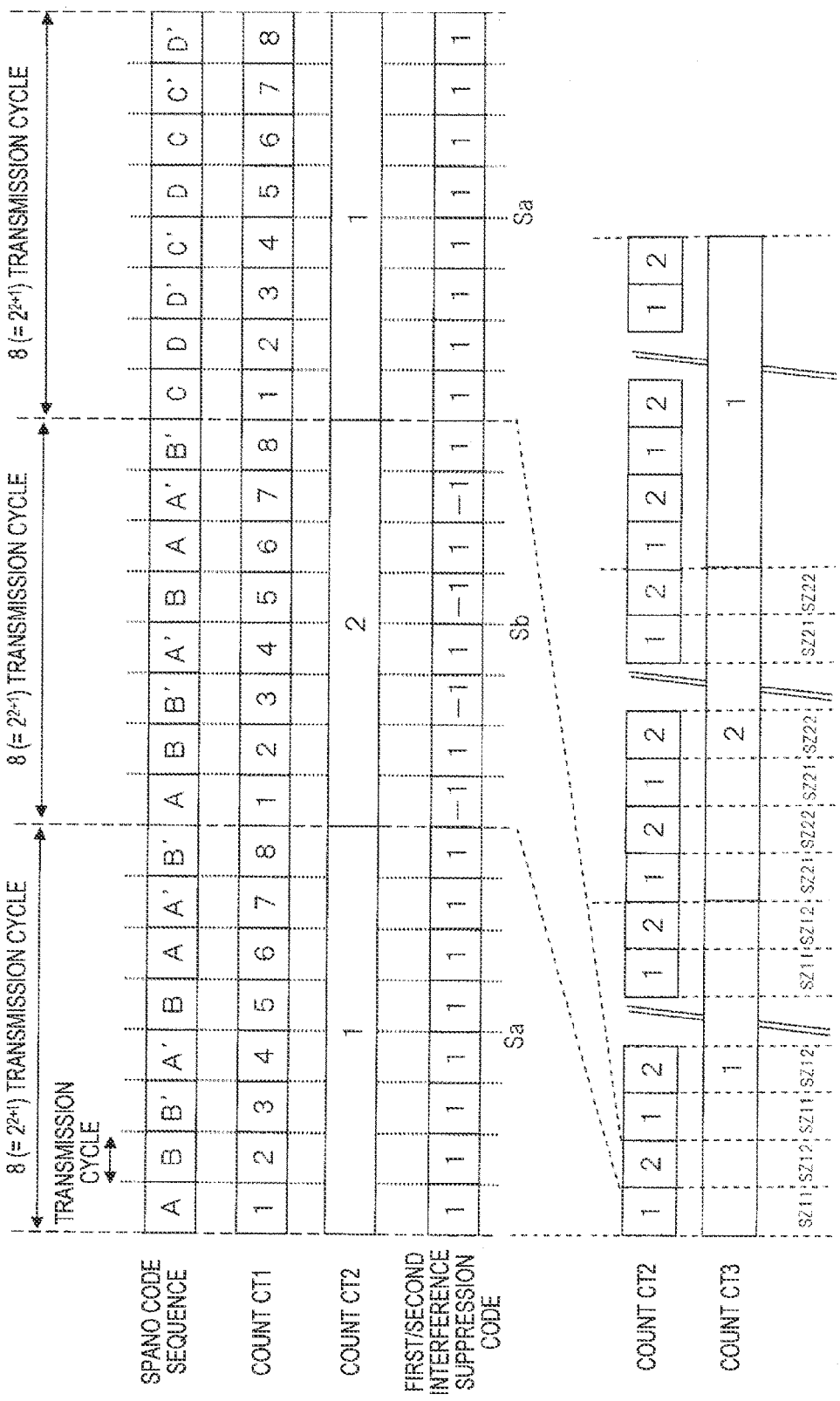
FIG. 8 shows example relationships between a Spano code sequence, pulse timing, counts, and interference suppression codes in the third embodiment.

The interference suppression code multiplication unit 405 superimposes the first interference suppression code Sa or the second interference suppression code Sb shown in FIG. 8 on an output of the transmission code control unit 212 (i.e., multiplies the latter by the former). Therefore, the interference suppression code multiplication unit 405 of the radar apparatus 150 generates a transmission code sequence

A, B, B', A', B, A, A', B',
A, B, B', A', B, A, A', B',
. . . .

The phase rotation unit 411 introduces a phase rotation of 90° every time two transmission pulses have been transmitted. In this case, the radar apparatus 150 transmits transmission signals A, B, jB', jA', −B, −A, −jA', −jB',
A, B, jB', jA', −B, −A, −jA', −jB',
. . . .

On the other hand, every time two reception pulses (two of the above reception signals) are received, the phase rotation unit 413 gives, progressively, to them, a phase rotation that is opposite to the one given by the phase rotation unit 411, that is, a phase rotation of −90°. In this case, the radar apparatus 150 receives reception signals

A, B, B', A', B, A, A', B',
A, B, B', A', B, A, A', B',
. . . .

As is understood from the above description, the radar apparatus 100 provides the same advantages as the radar apparatus 150 according to the first embodiment though the phase rotation unit 411 is disposed upstream of the DAC 220 and the phase rotation unit 413 is disposed downstream of the ADC 270.

Embodiment 2

In addition to the 8-code sequence (A, B, B', A', B, A, A', B') used in the first embodiment, a 4-code sequence (A, B, B, A) is known as a Spano code sequence having the feature that the correlation characteristic of a reception signal is not degraded even when phase rotation has occurred in the reception signal due to a Doppler frequency variation.

In a second embodiment, a radar apparatus 100 generates a transmission signal by multiplying one of four codes of a Spano code sequence (A, B, B, A) by one code, having a length 1, of one of a first interference suppression code Sa and a second interference suppression code Sb each having a code length 4 in every transmission cycle. Since the configuration of the radar apparatus 100 according to this embodiment is similar to that of the radar apparatus 100 according to the first embodiment, the same symbols as used in the latter will be used. The differences from the radar apparatus 100 according to the first embodiment will be described below.

The transmission code storage unit 401 stores, for example, a two-code sequence (A, B) of a Spano code sequence (A, B, B, A) as codes to be used by the radar apparatus 100 to generate a radar transmission signal TX-RD.

The pulse counter 402a increments a count CT1 in response to a generation timing signal SG supplied from the transmission code control unit 212, and outputs the resulting count CT1 to the interference suppression code control unit 404. The count CT1 varies from "1" to "4" (integers) repeatedly in such a manner as to return to "1" after "4," and corresponds to the transmission cycle of a radar transmission signal TX-RD one to one. For example, the count CT1 becomes "1" in a first transmission cycle of a radar transmission signal TX-RD, becomes "4" in a fourth transmission cycle of a radar transmission signal TX-RD, and again becomes "1" in a fifth transmission cycle of a radar transmission signal TX-RD.

The pulse counter 402b increments a count CT2 when it has received a generation timing signal SG four times from the transmission code control unit 212, and outputs the resulting count CT2 to the interference suppression code control unit 404. For example, the count CT2 becomes "1" in first to fourth transmission cycles of radar transmission signals TX-RD, becomes "2" in fifth to eighth transmission cycles of radar transmission signals TX-RD, and again becomes "1" in ninth to 12th transmission cycles of radar transmission signals TX-RD.

The interference suppression codes storage unit 403 stores a first interference suppression code Sa and a second interference suppression code Sb each having a code length 4 ($=2^{1+1}$). In the embodiment, the first interference suppression code Sa and the second interference suppression code Sb are vectors each having a length 4 and are, for example, given by Sa=[1, 1, 1, 1]
Sb=[−1, 1, −1, 1].

In the embodiment, a kth code of the first interference suppression code Sa having a code length 4 is represented by Sa(k) and a kth code of the second interference suppression code Sb having a code length 4 is represented by Sb(k). For example, Sa(1) and Sb(1) are "1" and "−1," respectively. Symbol k is an integer and varies from "1" to "4," and symbols $k_{min}$ and $k_{max}$ have values "1" and "4," respectively.

In the embodiment, the first interference suppression code Sa and the second interference suppression code Sb are used alternately in units of four ($=2^{1+1}$) transmission cycles. As for codes used in individual pairs of adjoining ones of two times four ($=2^{1+1}$) transmission cycles, the sum total of (term 13) inner products of first interference suppression codes Sa(k) and Sa(k+1) (k=1 to 3);
(term 23) an inner product of the first interference suppression code Sa($k_{max}$) and the second interference suppression code Sb($k_{min}$);
(term 33) inner products of second interference suppression codes Sb(k) and Sb(k+1) (k=1 to 3); and
(term 43) an inner product of the second interference suppression code Sb($k_{max}$) and the first interference suppression code Sa($k_{min}$)

is equal to 0.

That is, Equations (4), (8), and (9) hold. A vector Xa which is given by Equation (8) corresponds to the sum of the inner products of the above-described terms 13 and 23. A vector Xb which is given by Equation (9) corresponds to the sum of the inner products of the above-described terms 31 and 41.

[Formula 8]

$$Xa=[Sa(1)\cdot Sa(2), Sa(2)\cdot Sa(3), Sa(3)\cdot Sa(4), Sa(4)\cdot Sb(1)] \quad (8)$$

[Formula 9]

$$Xb=[Sb(1)\cdot Sb(2), Sb(2)\cdot Sb(3), Sb(3)\cdot Sb(4), Sb(4)\cdot Sa(1)] \quad (9)$$

The interference suppression code multiplication unit 405 which is a multiplication code multiplying unit generates transmission signals

A, B, B, A, −A, B, −B, A in a total of eight transmission cycles, the number eight being two times the number (four) of codes of the Spano code sequence (A, B, B, A).

For example, assume that a reflection wave signal produced as a result of reflection by the target TAR of a radar transmission signal TX-RD transmitted by the radar apparatus 100 in an nth transmission cycle has been received in the (n+1)th transmission cycle (e.g., n is an integer and varies from 1 to 8) instead of the nth transmission cycle. The coherent addition unit (Spano code) 291 outputs the following as an addition processing result of interference components of reception signals that are received in (n+1)th transmission cycles where n=1 to 8:

$(A\#B) + (B\#B) + (B\#A) + (A\#(-A)) +$ $((-A)\#B) + (B\#(-B)) + ((-B)\#A) + (A\#A) =$ $(A\#B) + (B\#B) + (B\#A) - (A\#A) - (A\#B) - (B\#B) - (B\#A) + (A\#A) = 0$

Therefore, also in the embodiment, interference can be suppressed in the radar apparatus 100.

As described above, for example, the radar apparatus 100 according to the embodiment generates a transmission code in every transmission cycle of a radar transmission signal TX-RD by multiplying one, selected in prescribed order, of the four ($=2^{1+1}$) codes of the Spano code sequence (A, B, B, A) by one code having a length 1, selected in prescribed order, of one of the first interference suppression code Sa and the second interference suppression code Sb each having a code length 4 ($=2^{1+1}$).

The first interference suppression code Sa and the second interference suppression code Sb are used alternately in units of four ($=2^{1+1}$) transmission cycles. As for codes used in individual pairs of adjoining ones of two times four ($=2^{1+1}$) transmission cycles, the sum total of (term 14) inner products of first interference suppression codes Sa(k) and Sa(k+1) (k=1 to 3);
(term 24) an inner product of the first interference suppression code Sa($k_{max}$) and the second interference suppression code Sb($k_{min}$);
(term 34) inner products of second interference suppression codes Sb(k) and Sb(k+1) (k=1 to 3); and
(term 44) an inner product of the second interference suppression code Sb($k_{max}$) and the first interference suppression code Sa($k_{min}$)

is equal to 0.

Furthermore, the coherent addition unit (Spano code) 291 performs addition processing on sets of autocorrelation values that have been calculated by the correlator 280 in a prescribed coherent addition number (e.g., eight which is two times the number (4) of codes constituting the Spano code sequence) of transmission cycles.

Operating in the above-described manner, the radar apparatus 100 according to the embodiment can make the sum of interference components of reception signals and thereby suppress interference even in the case where a reflection wave signal produced as a result of reflection by the target TAR of a radar transmission signal TX-RD transmitted in an nth transmission cycle is received in the (n+1)th transmission cycle instead of the nth transmission cycle. That is, the radar apparatus 100 according to the embodiment can prevent degradation of the correlation characteristic of a reception signal and suppress interference of a reception signal even in the case where phase rotation occurs in a reception signal due to a Doppler frequency variation.

(Example Modifications of First Orthogonal Code Sequence and Second Orthogonal Code Sequence Used in Embodiment 2)

In the second embodiment the first interference suppression code Sa and the second interference suppression code Sb are as follows:

Sa=[1, 1, 1, 1]
Sb=[−1, 1, −1, 1]

They may be replaced by

Sa=[1, 1, 1, 1]
Sb=[1, −1, 1, −1]

which satisfy Equations (4), (8), and (9), or

Sa=[1, 1, −1, −1]
Sb=[1, −1, −1, 1]

which satisfy Equations (4), (8), and (9).

(Example Modifications of First Interference Suppression Code and Second Interference Suppression Code which Depend on the Number of Codes of Spano Code Sequence)

The 8-code sequence (A, B, B', A', B, A, A', B') and the 4-code sequence (A, B, B, A) are known as Spano code sequences having the feature that the correlation characteristic of a reception signal is not degraded even when phase rotation has occurred in the reception signal due to a Doppler frequency variation. When a 16-code or 32-code Spano code sequence exists, the radar apparatus 100 can provide the same advantages as each of the above embodiments by using the following example combination of a first interference suppression code Sa and a second interference suppression code Sb.

For example, when a 16-code Spano code sequence exists, the following example first interference suppression code Sa and second interference suppression code Sb which are vectors having a length 16 are usable:

Sa=[1, 1, 1, 1, 1, 1, 1, 1, 1, 1, 1, 1, 1, 1, 1, 1]
Sb=[−1, 1, −1, 1, −1, 1, −1, 1, −1, 1, −1, 1, −1, 1, −1, 1]

For the above first interference suppression code Sa and the second interference suppression code Sb, Equations (10) and (11) hold:

[Formula 10]

$$Xa=[Sa(1) \cdot Sa(2), Sa(2) \cdot Sa(3), Sa(3) \cdot Sa(4), Sa(4) \cdot Sa(5),\\ Sa(5) \cdot Sa(6), Sa(6) \cdot Sa(7), Sa(7) \cdot Sa(8), Sa(8) \cdot Sa(9),\\ Sa(9) \cdot Sa(10), Sa(10) \cdot Sa(11), Sa(11) \cdot Sa(12), Sa(12)\\ \cdot Sa(13), Sa(13) \cdot Sa(14), Sa(14) \cdot Sa(15), Sa(15) \cdot Sa\\ (16), Sa(16) \cdot Sb(1)] \quad (10)$$

[Formula 11]

$$Xb=[Sb(1) \cdot Sb(2), Sb(2) \cdot Sb(3), Sb(3) \cdot Sb(4), Sb(4) \cdot Sb(5),\\ Sb(5) \cdot Sb(6), Sb(6) Sb(7), Sb(7) \cdot Sb(8), Sb(8) \cdot Sb(9),\\ Sb(9) \cdot Sb(10), Sb(10) \cdot Sb(11), Sb(11) \cdot Sb(12), Sb(12)\\ \cdot Sb(13), Sb(13) \cdot Sb(14), Sb(14) \cdot Sb(15), Sb(15) \cdot Sb\\ (16), Sb(16) \cdot Sa(1)] \quad (11)$$

Other examples which satisfy Equations (4), (10), and (11) are

Sa=[1, 1, 1, 1, 1, 1, 1, 1, 1, 1, 1, 1, 1, 1, 1, 1]
Sb=[1, −1, 1, −1, 1, −1, 1, −1, 1, −1, 1, −1, 1, −1, 1, −1],
and
Sa=[1, 1, −1, −1, 1, 1, −1, −1, 1, 1, −1, −1, 1, 1, −1, −1]
Sb=[1, −1, −1, 1, 1, −1, −1, 1, 1, −1, −1, 1, 1, −1, −1, 1].

Furthermore, when a 32-code Spano code sequence exists, the following example first interference suppression code Sa and second interference suppression code Sb which are vectors having a length 32 are usable:

Sa=[1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1]
Sb=[1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1]

For the above first interference suppression code Sa and the second interference suppression code Sb, Equations (12) and (13) hold:

[Formula 12]

$$Xa=[Sa(1) \cdot Sa(2), Sa(2) \cdot Sa(3), Sa(3) \cdot Sa(4), Sa(4) \cdot Sa(5),\\ Sa(5) \cdot Sa(6), Sa(6) \cdot Sa(7), Sa(7) \cdot Sa(8), Sa(8) \cdot Sa(9),\\ Sa(9) \cdot Sa(10), Sa(10) \cdot Sa(11), Sa(11) \cdot Sa(12), Sa(12)\\ \cdot Sa(13), Sa(13) \cdot Sa(14), Sa(14) \cdot Sa(15), Sa(15) \cdot Sa\\ (16), Sa(16) \cdot Sa(17), Sa(17) \cdot Sa(18), Sa(18) \cdot Sa(19),\\ Sa(19) \cdot Sa(20), Sa(20) \cdot Sa(21), Sa(21) \cdot Sa(22), Sa\\ (22) \cdot Sa(23), Sa(23) \cdot Sa(24), Sa(24) \cdot Sa(25), Sa(25)\\ \cdot Sa(26), Sa(26) \cdot Sa(27), Sa(27) \cdot Sa(28), Sa(28) \cdot Sa\\ (29), Sa(29) \cdot Sa(30), Sa(30) \cdot Sa(31), Sa(31) \cdot Sa(32),\\ Sa(32) \cdot Sb(1)] \quad (12)$$

[Formula 13]

$$Xb=[Sb(1) \cdot Sb(2), Sb(2) \cdot Sb(3), Sb(3) \cdot Sb(4), Sb(4) \cdot Sb(5),\\ Sb(5) \cdot Sb(6), Sb(6) \cdot Sb(7), Sb(7) \cdot Sb(8), Sb(8) \cdot Sb(9),\\ Sb(9) \cdot Sb(10), Sb(10) \cdot Sb(11), Sb(11) \cdot Sb(12), Sb(12)\\ \cdot Sb(13), Sb(13) \cdot Sb(14), Sb(14) \cdot Sb(15), Sb(15) \cdot Sb\\ (16), Sb(16) \cdot Sb(17), Sb(17) \cdot Sb(18), Sb(18) \cdot Sb(19),\\ Sb(19) \cdot Sb(20), Sb(20) \cdot Sb(21), Sb(21) \cdot Sb(22), Sb\\ (22) \cdot Sb(23), Sb(23) \cdot Sb(24), Sb(24) \cdot Sb(25), Sb(25)\\ \cdot Sb(26), Sb(26) \cdot Sb(27), Sb(27) \cdot Sb(28), Sb(28) \cdot Sb\\ (29), Sb(29) \cdot Sb(30), Sb(30) \cdot Sb(31), Sb(31) \cdot Sb(32),\\ Sb(32) \cdot Sa(1)] \quad (13)$$

Other examples which satisfy Equations (4), (12), and (13) are

Sa=[1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1]
Sb=[−1, 1, −1, 1, −1, 1, −1, 1, −1, 1, −1, 1, −1, 1, −1, 1, −1, 1, −1, 1, −1, 1, −1, 1, −1, 1, −1, 1, −1, 1, −1, 1],
and
Sa=[1, 1, −1, −1, 1, 1, −1, −1, 1, 1, −1, −1, 1, 1, −1, −1, 1, −1, −1, 1, 1, −1, −1, 1, 1, −1, −1, 1, 1, −1, −1]
Sb=[1, −1, −1, 1, 1, −1, −1, 1, 1, −1, −1, 1, 1, −1, −1, 1, −1, −1, 1, 1, −1, −1, 1, 1, −1, −1, 1, 1, −1, −1, 1,].

There are Spano code sequences other than the ones described in the embodiments, that is, (A, B, B', A', B, A, A', B'), (A, B, B, A), (C, D, C', D', D, C, C', D'), and (C, D, D, C) which are based on the complementary code (one pair of codes) (A, B) or (C, D). For example, 8-code Spano code sequences (A, B, B, A, B, A, A, B) and (A, B, D, C, B, A, C, D) and 4-code Spano code sequences (A, B, B', A') and (A, B, D, C) may also be used.

Embodiment 3

A third embodiment is directed to a method for suppressing inter-range interference in the case of using a Spano code including plural complementary codes (pairs of codes).

The first embodiment assumes the case that one code is used in each transmission cycle and eight codes (A, B, B', A', B, A, A', B') are transmitted repeatedly in units of a total of eight transmission cycles (repetition cycle).

It is possible to generate a Spano code sequence containing different sets of eight codes by using eight codes (A, B, B', A', B, A, A', B') first which are based on the complementary code (A, B) and then another set of eight codes (C, D, D', C', D, C, C', D') which are based on the other complementary code (C, D).

For example, in the case of a Spano code having a code length 64, 16 different kinds of complementary codes (pairs of codes) are used and a total of 128 codes (8 codes×16) constitute one repetition cycle.

When the code length is equal to L, L/4 complementary codes (pairs of codes) are used and the total number of codes becomes equal to 8×L/4=2×L.

The third embodiment is directed to a method for reducing inter-range interference and thereby suppressing deterioration of the Doppler resistance of a Spano code that is based on plural different complementary codes and has 2×L codes which are sets of eight codes.

Where each set of eight codes is multiplied by an interference suppression code as in the first embodiment for a Spano code in which eight codes are repeated L/4 times, no consideration needs to be given to deterioration of the Doppler resistance because the repetition cycle of eight codes is also a Doppler phase variation cancellation unit. However, as described below, it is insufficient in terms of inter-range interference.

For example, where L=8, the entire code sequence becomes (A, B, B', A', B, A, A', B', C, D, D', C', D, C, C', D') which has 16 codes.

When the 8-code interference suppression codes
Sa=[1, 1, 1, 1, 1, 1, 1, 1]
Sb=[−1, 1, −1, 1, −1, 1, −1, 1]
are used as in the first embodiment, the following code sequence is generated:

A, B, B', A', B, A, A', B', −A, B, −B', A', −B, A, −A', B', C, D, D', C', D, C, C', D', −C, D, −D', C', −D, C, −C', D'

When the coherent addition unit (Spano code) 291 performs coherent addition on interference components between this sequence and transmission signals that were transmitted one transmission cycle before, a calculation result is as follows:

$(A\#B)+(B\#B')+(B'\#A')+(A'\#B)+(B\#A)+(A\#A')+$
$(A'\#B')+(B'\#(-A))+((-A)\#B)+(B\#(-B'))+((-B')$
$\#A')+(A'\#(-B))+((-B)\#A)+(A\#(-A'))+((-A')\#B')+$
$(B'\#C)+(C\#D)+(D\#D')+(D'\#C')+(C'\#D)+(D\#C)+$
$(C\#C')+(C'\#D')+(D'\#(-C))+((-C)\#D)+($
$D\#(-D'))+((-D')\#C')+(C'\#(-D))+((-D)\#C)+$
$(C\#(-C'))+((-C')\#D')+(D'\#A)=(B\#(-A))+$
$(B'\#C)+(D'\#(-C))+(D'\#A)$

That is, part of the inter-rage interference components are not canceled out and hence the calculation result is not equal to 0.

On the other hand, when the Doppler phase variation cancellation unit is set equal to 2 L (e.g., 16), Doppler phase variation cancellation is possible. However, the unit of cancellation of inter-range interference is elongated, that is, a long time elapses until completion of transmission of a code sequence that enables cancellation of inter-range interference components (i.e., until the next cancellation unit). As a result, the influence of transmission path variations becomes too large during a period of pulse transmissions to enable complete cancellation of inter-range interference.

In view of the above, in the third embodiment, multiplication by two kinds of sets of interference suppression codes is performed in the following manner.

Specifically, 8-code interference suppression codes Sa and Sb (refer to the first embodiment) and 2 L-code interference suppression codes SZa and SZb are used.

With L assumed to be 64, a description will be made of an example sequence which is based on 16 kinds of complementary codes (pair of codes) and has 8×16 codes arranged in units of 8 codes.

The 8×16-code sequence is

A, B, B', A', B, A, A', B', −A, B, −B', A', −B, A, −A', B', C, D, D', C', D, C, C', D', −C, D, −D', C', −D, C, −C', D', ~.

The above sequence is multiplied by the 8-code interference suppression codes Sa and Sb to generate a sequence containing 8×16×2 codes (the number of codes is doubled).

That is, the following sequence is generated:

A·Sa(1), B·Sa(2), B'·Sa(3), A'·Sa(4), B·Sa(5), A·Sa(6), A'·Sa(7), B'·Sa(8), A·Sb(1), B·Sb(2), B'·Sb(3), A'·Sb(4), B·Sb (5), A·Sb(6), A'·Sb(7), B'·Sb(8), C·Sa(1), D·Sa(2), ~

Furthermore, in the third embodiment, the sequence having 8×16×2 codes is repeated to generate a sequence containing 8×16×2×2 codes. And the interference suppression code multiplication unit 405 multiplies the codes, multiplied by the first interference suppression code Sa, of the first 8×16×2-code Spano code sequence by an interference suppression code SZ11 and multiplies the codes, multiplied by the second interference suppression code Sb, of the first 8×16×2-code Spano code sequence by an interference suppression code SZ12.

Furthermore, the interference suppression code multiplication unit 405 multiplies the codes, multiplied by the first interference suppression code Sa, of the second 8×16×2-code pulse code sequence by an interference suppression code SZ21 and multiplies the codes, multiplied by the second interference suppression code Sb, of the second 8×16×2-code Spano code sequence by an interference suppression code SZ22.

The total number of codes is again doubled by the above two kinds of interference suppression codes, that is, the total number of codes finally becomes equal to four times the original number. This processing is equivalent to double interference suppression codes multiplication processing.

That is, a sequence obtained by the double interference suppression codes multiplication processing is as follows:

A·Sa(1)·SZ11, B·Sa(2)·SZ11, B'·Sa(3)·SZ11, A'·Sa(4)·SZ11, B·Sa(5)·SZ11, A·Sa(6)·SZ11, A'·Sa(7)·SZ11, B'·Sa(8)·SZ11, A·Sb(1)·SZ12, B·Sb(2)·SZ12, B'·Sb(3)·SZ12, A'·Sb(4)·SZ12, B·Sb(5)·SZ12, A·Sb(6)·SZ12, A'·Sb(7)·SZ12, B'·Sb(8)·SZ12, C·Sa(1)·SZ11, D·Sa(2)·SZ11, ~(8×16×2 codes in total), A·Sa(1)·SZ21, B·Sa(2)·SZ21, B'·Sa(3)·SZ21, A'·Sa(4)·SZ21, B·Sa(5)·SZ21, A·Sa(6)·SZ21, A'·Sa(7)·SZ21, B'·Sa(8)·SZ21, A·Sb(1)·SZ22, B·Sb(2)·SZ22, B'·Sb(3)·SZ22, A'·Sb(4)·SZ22, B·Sb(5)·SZ22, A·Sb(6)·SZ22, A'·Sb(7)·SZ22, B'·Sb(8)·SZ22, C·Sa(1)·SZ21, D·Sa(2)·SZ21, ~(8×16×2 codes in total)

The total number of codes of the sequence is equal to 8×16×4.

It is noted that the interference suppression codes Sa and Sb used in the third embodiment are the same as those used in the first embodiment.

It suffices that each of the SZ11, SZ12, SZ21, and SZ22 used in the third embodiment be a 1-bit code and have a value "1," or "−1," and that they satisfy the relationship $SZ11 \cdot SZ12 = -SZ21 \cdot SZ22$.

For example, in the above-described case of L=8, the entire code sequence contains 16 codes

A, B, B', A', B, A, A', B', C, D, D', C', D, C, C', D'.

When the 8-code interference suppression codes

Sa=[1, 1, 1, 1, 1, 1, 1, 1]

Sb=[−1, 1, −1, 1, −1, 1, −1, 1]

are used as in the first embodiment, the following code sequence is generated:

When the coherent addition unit (Spano code) 291 performs coherent addition on inter-range interference components (it is assumed that SZ11=1, SZ12=1, SZ21=1, and SZ22=−1), a calculation result is as follows:

$$(A\#B)+(B\#B')+(B'\#A')+(A'\#B)+(B\#A)+(A\#A')+\\(A'\#B')+(B'\#(-A))+(-A)\#B)+(B\#(-B'))+((-B')\\ \#A')+(A'\#(-B))+((-B)\#A)+(A\#(-A'))+((-A')\#B')+\\(B'\#C)+(C\#D)+(D\#D')+(D'\#C')+(C'\#D)+(D\#C)+\\(C\#C')+(C'\#D')+(D'\#(-C))+(-C)\#D)+(D\#(-D'))+\\((-D')\#C')+(C'\#(-D))+((-D)\#C)+(C\#(-C'))+\\((-C')\#D')+(D'\#A)+(A\#B)+(B\#B')+(B'\#A')+\\(A'\#B)+(B\#A)+(A\#A')+(A'\#B')+(B'\#A)+(A\#(-B))+\\((-B)\#B')+(B'\#(-A'))+((-A')\#B)+(B\#(-A))+((-A)\\ \#A')+(A'\#(-B'))+((-B')\#C)+(C\#D)+(D\#D')+\\(D'\#C')+(C'\#D)+(D\#C)+(C\#C')+(C'\#D')+\\(D'\#C)+(C\#(-D))+((-D)\#D')+((-D')\#(-C'))+\\((-C')\#D)+(D\#(-C))+((-C)\#C')+(C'\#(-D'))+((-D')\#A)=(B'\#(-A))+(B'\#C)+(D'\#(-C))+(D'\#A)+\\(B'\#A)+((-B')\#C)+(D'\#C)+((-D')\#A)=0$$

The inter-range interference components are thus made equal to 0 by the double interference suppression codes multiplication processing.

Figure 7:
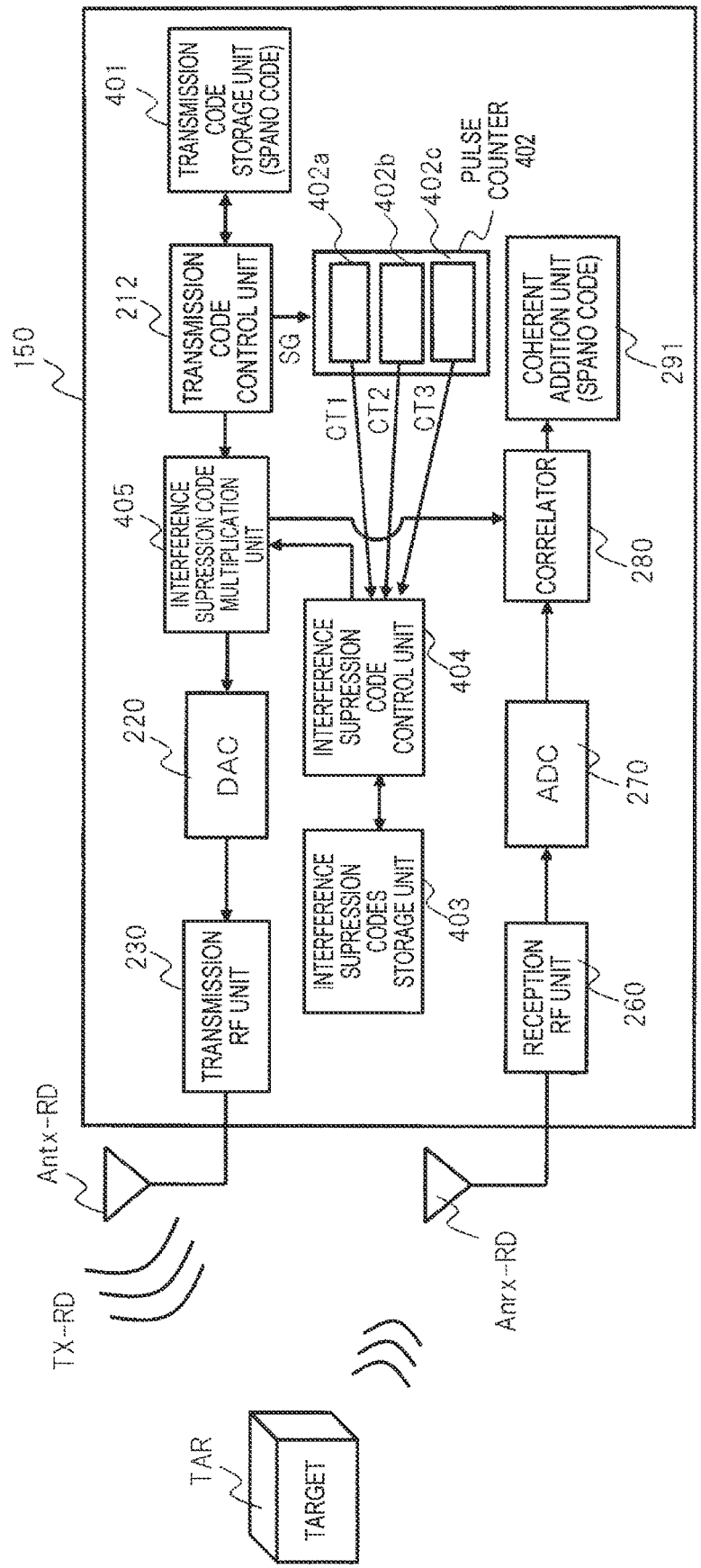
FIG. 7 is a block diagram showing the internal configuration of a radar apparatus according to a third embodiment.

FIG. 7 is a block diagram showing the internal configuration of the radar apparatus 150 according to the third embodiment, which is different from the radar apparatus 100 according to the first embodiment shown in FIG. 5 in that the pulse counter 402 has an additional counter 402c.

The counter 402c is incremented when the count CT2 has taken values "1" and "2" repeatedly L/4 times (see FIG. 8). The count of the counter 402c becomes "1" after "2." FIG. 8 shows example relationships between a Spano code sequence, pulse timing, counts, interference suppression codes in the third embodiment.

The interference suppression codes storage unit 403 stores the interference suppression codes SZ11, SZ12, SZ21, and SZ22 in addition to the interference suppression codes Sa and Sb.

The interference suppression code multiplication unit 405 multiplies a Spano code sequence by the interference suppression code Sa or Sb and then multiplies multiplication results by the interference suppression code SZ11, SZ12, SZ21, or SZ22 according to the counts CT2 and CT3.

The interference suppression code control unit 404 uses the interference suppression code SZ11 when the counts CT2 and CT3 are "1" and "1," respectively, uses the interference suppression code SZ12 when the counts CT2 and CT3 are "2"

and "1," respectively, uses the interference suppression code SZ21 when the counts CT2 and CT3 are "1" and "2," respectively, and uses the interference suppression code SZ22 when the counts CT2 and CT3 are "2" and "2," respectively.

Specifically, the interference suppression code multiplication unit 405 multiplies results of multiplication by the interference suppression code Sa or Sb by the interference suppression code SZ11 when the counts CT2 and CT3 are "1" and "1," respectively, by the interference suppression code SZ12 when the counts CT2 and CT3 are "2" and "1," respectively, by the interference suppression code SZ21 when the counts CT2 and CT3 are "1" and "2," respectively, and by the interference suppression code SZ22 when the counts CT2 and CT3 are "2" and "2," respectively.

As described above, in the radar apparatus 150 according to the third embodiment, double interference suppression codes multiplication processing is performed on a Spano code containing sets of eight codes, that is, multiplication by an interference suppression code for absorbing a Doppler phase rotation is done for every 8 codes and multiplication by other interference suppression codes is done for every full sequence. As a result, deterioration of Doppler resistance can be suppressed and inter-range interference can be eliminated for a long entire sequence.

Although the various embodiments have been described above with reference to the drawings, it goes without saying that this disclosure is not limited to those examples. It is apparent that those skilled in the art would conceive various changes or modifications within the confines of the claims. And such changes or modifications should naturally be construed as being included in the technical scope of the disclosure.

In the first embodiment, the radar apparatus 100 may generate transmission signals using any selected two or four of the 8 codes of the Spano code sequence (A, B, B', A', B, A, A', B').

In the first embodiment, when there exist a first interference suppression code Sa, a second interference suppression code Sb, and a third interference suppression code Sc that satisfy Equations (4) and (14)-(16), the radar apparatus 100 may generate transmission signals using the 8-code Spano code sequence (A, B, B', A', B, A, A', B'), the first interference suppression code Sa, the second interference suppression code Sb, and the third interference suppression code Sc over a total of 24 transmission cycles, the number 24 being three times the number (eight) of codes of the Spano code sequence (A, B, B', A', B, A, A', B').

[Formula 14]

$$Xa+Xb+Xc=0 \tag{14}$$

[Formula 15]

$$Xb=[Sb(1) \cdot Sb(2), Sb(2) \cdot Sb(3), Sb(3) \cdot Sb(4), Sb(4) \cdot Sb(5), Sb(5) \cdot Sb(6), Sb(6) \cdot Sb(7), Sb(7) \cdot Sb(8), Sb(8) \cdot Sc(1)] \tag{15}$$

[Formula 16]

$$Xc=[Sc(1) \cdot Sc(2), Sc(2) \cdot Sc(3), Sc(3) \cdot Sc(4), Sc(4) \cdot Sc(5), Sc(5) \cdot Sc(6), Sc(6) \cdot Sc(7), Sc(7) \cdot Sc(8), Sc(8) \cdot Sa(1)] \tag{16}$$

The present application is based on Japanese Patent Application No. 2013-036340 filed on Feb. 26, 2013, the disclosure of which is incorporated herein by reference.

INDUSTRIAL APPLICABILITY

This disclosure is useful when applied to radar apparatus which prevents degradation of the correlation characteristic of a reception signal and suppresses interference in a reception signal even in the case where phase rotation occurs in a reception signal due to a Doppler frequency variation.

This disclosure may also be applied to radar apparatus capable of detection in a very-wide-angle range such as radar apparatus for infrastructures installed at intersections and vehicular radar apparatus mounted on movable bodies such as vehicles.

DESCRIPTION OF REFERENCE SIGNS 100, 150: Radar Apparatus
212: Transmission Code Control Unit
220: DAC
230: Transmission RF Unit
260: Reception RF Unit
270: ADC
280: Correlator
290: Coherent Addition Unit
401: Transmission Code Storage Unit
402, 402a, 402b: Pulse Counter
403: Interference Suppression Codes Storage Unit
404: Interference Suppression Code Control Unit
405: Interference Suppression Code Multiplication Unit
Antx-RD: Transmission Antenna
Anrx-RD: Reception Antenna

The invention claimed is:

1. A radar apparatus comprising:
a transmission signal generating unit which sequentially generates transmission signals containing $2 \times M \times 2^{N+1}$ first multiplied codes by
multiplying $2^{N+1}$ (N: an integer that is larger than or equal to 1) codes contained in M (M: an integer that is larger than or equal to 1) kinds of Spano code sequences by respective elements of a first multiplication code sequence having a code length $2^{N+1}$ in respective transmission cycles, and
multiplying the $2^{N+1}$ codes of the M kinds of Spano code sequences by respective elements of a second multiplication code sequence having a code length $2^{N+1}$ in the respective transmission cycles; and
a transmission RF unit which converts the transmission signals into radio-frequency radar transmission signals and transmits the radio-frequency radar transmission signals from a transmission antenna,
wherein the first multiplication code sequence and the second multiplication code sequence are code sequences that satisfy Equation (1):

$$\sum_{k=1}^{2^{N+1}} (Sa(k) \times Sa(k+1)) + Sa(k\max) \times Sb(k\min) + \sum_{k=1}^{2^{N+1}} (Sb(k) \times Sb(k+1)) + Sb(k\max) \times Sa(k\min) = 0 \tag{1}$$

where
Sa(k) is an element of the first multiplication code sequence,
Sb(k) is an element of the second multiplication code sequence, and
k is an integer that is larger than or equal to 1 and smaller than or equal to $2^{N+1}$.

2. The radar apparatus according to claim 1,
wherein the transmission signal generating unit comprises:
- a transmission code storage unit which stores the M kinds of Spano code sequences;
- a multiplication codes storage unit which stores the first multiplication code sequence and the second multiplication code sequence; and
- a multiplication code multiplying unit which multiplies $2^{N+1}$ codes contained in a first Spano code sequence of the M kinds of Spano code sequences by the respective elements of the first multiplication code sequence or the second multiplication code sequence in the respective transmission cycles.

3. The radar apparatus according to claim 1, further comprising:
- a reception RF unit which receives, by a reception antenna, reflection wave signals produced as a result of reflection of the radar transmission signals by a target, and generates baseband reception signals;
- a correlation calculating unit which calculates sets of correlation values between the reception signals and the transmission signals containing the first multiplied codes generated by multiplication by the elements of the first multiplication code sequence or the second multiplication code sequence; and
- a coherent addition unit which adds up sets of correlation values calculated over $2 \times M \times 2^{N+1}$ transmission cycles.

4. The radar apparatus according to claim 1,
wherein N is equal to 2,
wherein the first multiplication code sequence is [1, 1, 1, 1, 1, 1, 1, 1], and
wherein the second multiplication code sequence is [−1, 1, −1, 1, −1, 1, −1, 1].

5. The radar apparatus according to claim 1,
wherein N is equal to 2,
wherein the first multiplication code sequence is [1, 1, −1, −1, 1, 1, −1, −1], and
wherein the second multiplication code sequence is [1, −1, −1, 1, 1, −1, −1, 1].

6. The radar apparatus according claim 1,
wherein N is equal to 1,
wherein the first multiplication code sequence is [1, 1, 1, 1], and wherein the second multiplication code sequence is [−1, 1, −1, 1].

7. The radar apparatus according to claim 1,
wherein N is equal to 1,
wherein the first multiplication code sequence is [1, 1, 1, 1], and wherein the second multiplication code sequence is [1, −1, 1, −1].

8. The radar apparatus according to claim 1,
wherein N is equal to 1,
wherein the first multiplication code sequence is [1, 1, −1, −1], and
wherein the second multiplication code sequence is [1, −1, −1, 1].

9. The radar apparatus according to claim 2,
wherein the transmission signals generated by the transmission signal generating unit contain:
- $2 \times M \times 2^{N+1}$ second multiplied codes generated by multiplying the first multiplied codes by a first multiplication code coefficient SZ11 and generated by multiplying the first multiplied codes by a first multiplication code coefficient SZ11 by a second multiplication code coefficient SZ12 in units of $2^{N+1}$ first multiplied codes, and
- $2 \times M \times 2^{N+1}$ third multiplied codes generated by multiplying the first multiplied codes by a third multiplication code coefficient SZ21 and generated by multiplying the first multiplied codes by a fourth multiplication code coefficient SZ22 in units of $2^{N+1}$ first multiplied codes, wherein the multiplication code coefficients SZ11, SZ12, SZ21, and SZ22 satisfies Equation (2):

$$SZ11 \cdot SZ12 = -SZ21 \cdot SZ22 \qquad (2)$$

10. The radar apparatus according to claim 9,
wherein the multiplication codes storage unit further stores the first multiplication code coefficient, the second multiplication code coefficient, the third multiplication code coefficient, and the fourth multiplication code coefficient.

11. The radar apparatus according to claim 9, further comprising:
- a reception RF unit which receives, by a reception antenna, reflection wave signals produced as a result of reflection of the radar transmission signals by a target, and generates baseband reception signals;
- a correlation calculating unit which calculates sets of correlation values between the reception signals and the second multiplied codes or the third multiplied codes; and
- a coherent addition unit which adds up sets of correlation values calculated over four times $2 \times M \times 2^{N+1}$ transmission cycles.

12. The radar apparatus according to claim 9,
wherein N is equal to 2,
wherein the first multiplication code sequence is [1, 1, 1, 1, 1, 1, 1, 1],
wherein the second multiplication code sequence is [−1, 1, −1, 1, −1, 1, −1, 1],
wherein the first multiplication code coefficient is "1,"
wherein the second multiplication code coefficient is "1,"
wherein the third multiplication code coefficient is "1," and
wherein the fourth multiplication code coefficient is "−1".

13. The radar apparatus according to claim 9,
wherein N is equal to 2,
wherein the first multiplication code sequence is [1, 1, −1, −1, 1, 1, −1, −1],
wherein the second multiplication code sequence is [1, −1, −1, 1, 1, −1, −1, 1],
wherein the first multiplication code coefficient is "1,"
wherein the second multiplication code coefficient is "1,"
wherein the third multiplication code coefficient is "1," and
wherein the fourth multiplication code coefficient is "−1".

14. The radar apparatus according to claim 9,
wherein N is equal to 1,
wherein the first multiplication code sequence is [1, 1, 1, 1],
wherein the second multiplication code sequence is [−1, 1, −1, 1], and
wherein for each set of $2 \times M \times 2^{N+1}$ codes,
- the first multiplication code coefficient is "1,"
- the second multiplication code coefficient is "1,"
- the third multiplication code coefficient is "1," and
- the fourth multiplication code coefficient is "−1".

15. The radar apparatus according to claim 9,
wherein N is equal to 1,
wherein the first multiplication code sequence is [1, 1, 1, 1],
wherein the second multiplication code sequence is [1, −1, 1, −1], and
wherein the first multiplication code coefficient is "1,"
wherein the second multiplication code coefficient is "1,"
wherein the third multiplication code coefficient is "1," and
wherein the fourth multiplication code coefficient is "−1".

16. The radar apparatus according to claim 9,
wherein N is equal to 1,
wherein the first multiplication code sequence is [1, 1, −1, −1],
wherein the second multiplication code sequence is [1, −1, −1, 1], and
wherein the first multiplication code coefficient is "1,"
wherein the second multiplication code coefficient is "1,"
wherein the third multiplication code coefficient is "1," and
wherein the fourth multiplication code coefficient is "−1".

* * * * *